(12) United States Patent
Boebert et al.

(10) Patent No.: US 7,730,299 B2
(45) Date of Patent: *Jun. 1, 2010

(54) SYSTEM AND METHOD FOR PROVIDING SECURE INTERNETWORK SERVICES VIA AN ASSURED PIPELINE

(75) Inventors: William E. Boebert, Minneapolis, MN (US); Clyde O. Rogers, White Bear Lake, MN (US); Glenn Andreas, Fridley, MN (US); Scott W. Hammond, Maplewood, MN (US); Mark P. Gooderum, St. Louis Park, MN (US)

(73) Assignee: Secure Computing, LLC, San Jose, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/669,025

(22) Filed: Jan. 30, 2007

(65) Prior Publication Data
US 2007/0226789 A1 Sep. 27, 2007

Related U.S. Application Data

(63) Continuation of application No. 10/854,602, filed on May 26, 2004, now Pat. No. 7,181,613, which is a continuation of application No. 09/221,665, filed on Dec. 23, 1998, now Pat. No. 6,772,332, which is a continuation of application No. 08/322,078, filed on Oct. 12, 1994, now Pat. No. 5,864,683.

(51) Int. Cl.
*H04L 9/00* (2006.01)
(52) U.S. Cl. .................. 713/153; 713/152; 713/164; 709/229
(58) Field of Classification Search ............ 713/153, 713/152, 164, 161, 162, 15, 201; 709/229; 380/44
See application file for complete search history.

(56) References Cited

U.S. PATENT DOCUMENTS 3,956,615 A 5/1976 Anderson et al.

(Continued)

FOREIGN PATENT DOCUMENTS

EP 0420779 4/1991

(Continued)

OTHER PUBLICATIONS

News Release: "100% of Hackers Failed to Break Into One Internet Site Protected by Sidewinder(tm)", Secure Computing Corporation,(Feb. 16, 1995),2.

(Continued)

*Primary Examiner*—Le Luu
(74) *Attorney, Agent, or Firm*—Schwegman, Lundberg & Woessner, P.A.

(57) ABSTRACT

A system and method for the secure transfer of data between a workstation connected to a private network and a remote computer connected to an unsecured network. A secure computer is inserted into the private network to serve as the gateway to the unsecured network and a client subsystem is added to the workstation in order to control the transfer of data from the workstation to the secure computer. The secure computer includes a private network interface connected to the private network, an unsecured network interface connected to the unsecured network, wherein the unsecured network interface includes means for encrypting data to be transferred from the first workstation to the remote computer and a server function for transferring data between the private network interface and the unsecured network interface.

21 Claims, 14 Drawing Sheets

U.S. PATENT DOCUMENTS

| | | | |
|---|---|---|---|
| 4,104,721 A | 8/1978 | Markstein et al. | |
| 4,177,510 A | 12/1979 | Appell et al. | |
| 4,442,484 A | 4/1984 | Childs, Jr. et al. | |
| 4,584,639 A | 4/1986 | Hardy | |
| 4,621,321 A | 11/1986 | Boebert et al. | |
| 4,648,031 A | 3/1987 | Jenner | |
| 4,661,951 A | 4/1987 | Segarra | |
| 4,701,840 A | 10/1987 | Boebert et al. | |
| 4,713,753 A | 12/1987 | Boebert et al. | |
| 4,870,571 A | 9/1989 | Frink | |
| 4,885,789 A | 12/1989 | Burger et al. | |
| 4,888,801 A | 12/1989 | Foster et al. | |
| 4,914,568 A | 4/1990 | Kodosky et al. | |
| 4,914,590 A | 4/1990 | Loatman et al. | |
| 4,933,971 A | 6/1990 | Bestock et al. | |
| 5,056,140 A | 10/1991 | Kimbell | |
| 5,077,658 A | 12/1991 | Bendert et al. | |
| 5,093,914 A | 3/1992 | Coplien et al. | |
| 5,124,984 A | 6/1992 | Engel | |
| 5,153,918 A | 10/1992 | Tuai | |
| 5,204,961 A | 4/1993 | Barlow | |
| 5,228,083 A | 7/1993 | Lozowick et al. | |
| 5,251,131 A | 10/1993 | Masand et al. | |
| 5,263,147 A | 11/1993 | Francisco et al. | |
| 5,268,962 A | 12/1993 | Abadi et al. | |
| 5,272,754 A | 12/1993 | Boebert | |
| 5,276,735 A | 1/1994 | Boebert et al. | |
| 5,276,789 A | 1/1994 | Besaw et al. | |
| 5,303,303 A | 4/1994 | White | |
| 5,305,385 A | 4/1994 | Schanning et al. | |
| 5,311,593 A | 5/1994 | Carmi | |
| 5,329,623 A | 7/1994 | Smith et al. | |
| 5,333,266 A | 7/1994 | Boaz et al. | |
| 5,355,474 A | 10/1994 | Thuraisngham et al. | |
| 5,359,659 A | 10/1994 | Rosenthal | |
| 5,377,349 A | 12/1994 | Motomura | |
| 5,377,354 A | 12/1994 | Scannell et al. | |
| 5,386,471 A | 1/1995 | Bianco | |
| 5,414,833 A | 5/1995 | Hershey et al. | |
| 5,416,842 A | 5/1995 | Aziz | |
| 5,418,951 A | 5/1995 | Damashek | |
| 5,455,828 A | 10/1995 | Zisapel | |
| 5,485,460 A | 1/1996 | Schrier et al. | |
| 5,511,122 A | 4/1996 | Atkinson | |
| 5,530,758 A | 6/1996 | Marino, Jr. et al. | |
| 5,548,507 A | 8/1996 | Martino et al. | |
| 5,548,646 A | 8/1996 | Aziz et al. | |
| 5,548,649 A | 8/1996 | Jacobson | |
| 5,548,721 A | 8/1996 | Denslow | |
| 5,550,984 A | 8/1996 | Gelb | |
| 5,555,346 A | 9/1996 | Gross et al. | |
| 5,566,170 A | 10/1996 | Bakke et al. | |
| 5,583,940 A | 12/1996 | Vidrascu et al. | |
| 5,586,260 A | 12/1996 | Hu | |
| 5,604,490 A | 2/1997 | Blakley, III et al. | |
| 5,606,668 A | 2/1997 | Shwed | |
| 5,608,720 A | 3/1997 | Biegel et al. | |
| 5,615,340 A | 3/1997 | Dai et al. | |
| 5,619,648 A | 4/1997 | Canale et al. | |
| 5,623,601 A | 4/1997 | Vu | |
| 5,632,011 A | 5/1997 | Landfield et al. | |
| 5,634,084 A | 5/1997 | Malsheen et al. | |
| 5,636,371 A | 6/1997 | Yu | |
| 5,644,571 A | 7/1997 | Seaman | |
| 5,671,279 A | 9/1997 | Elgamal | |
| 5,673,322 A | 9/1997 | Pepe et al. | |
| 5,684,951 A | 11/1997 | Goldman et al. | |
| 5,689,566 A | 11/1997 | Nguyen | |
| 5,699,513 A | 12/1997 | Feigen et al. | |
| 5,706,507 A | 1/1998 | Schloss | |
| 5,708,780 A | 1/1998 | Levergood et al. | |
| 5,715,466 A | 2/1998 | Flanagan et al. | |
| 5,717,913 A | 2/1998 | Driscoll | |
| 5,720,035 A | 2/1998 | Allegre et al. | |
| 5,724,425 A | 3/1998 | Chang et al. | |
| 5,781,550 A | 7/1998 | Templin et al. | |
| 5,828,833 A | 10/1998 | Belville et al. | |
| 5,828,893 A | 10/1998 | Wied et al. | |
| 5,864,683 A | 1/1999 | Boebert et al. | |
| 5,867,647 A | 2/1999 | Haigh et al. | |
| 5,896,499 A | 4/1999 | McKelvey | |
| 5,898,830 A | 4/1999 | Wesinger, Jr. et al. | |
| 5,918,018 A | 6/1999 | Gooderum et al. | |
| 5,950,195 A | 9/1999 | Stockwell et al. | |
| 5,958,016 A | 9/1999 | Chang et al. | |
| 5,968,176 A | 10/1999 | Nessett et al. | |
| 6,219,707 B1 | 4/2001 | Gooderum et al. | |
| 6,453,419 B1 | 9/2002 | Flint et al. | |
| 6,772,332 B1 | 8/2004 | Boebert et al. | |
| 7,181,613 B2 | 2/2007 | Boebert et al. | |
| 2004/0230791 A1 | 11/2004 | Boebert et al. | |

FOREIGN PATENT DOCUMENTS

| | | |
|---|---|---|
| EP | 0 554 182 A1 | 4/1993 |
| EP | 0653862 | 5/1995 |
| EP | 686906 | 5/1995 |
| EP | 0720333 | 7/1996 |
| EP | 0 743 777 A2 | 11/1996 |
| GB | 2238212 | 5/1991 |
| GB | 2287619 | 9/1995 |
| WO | WO-96/13113 | 5/1996 |
| WO | WO-96/31035 | 10/1996 |
| WO | WO-96/35994 | 11/1996 |
| WO | WO-97/13340 | 4/1997 |
| WO | WO-97/16911 | 5/1997 |
| WO | WO-97/23972 | 7/1997 |
| WO | WO-97/26731 | 7/1997 |
| WO | WO-97/26734 | 7/1997 |
| WO | WO-97/26735 | 7/1997 |
| WO | WO-97/29413 | 8/1997 |

OTHER PUBLICATIONS

News Release: "Internet Security System Given 'Product of the Year' Award", Secure Computing Corporation,(Mar. 28, 1995),2.

News Release: "SATAN No Threat to Sidewinder(tm)", Secure Computing Corporation,(Apr. 26, 1995),2.

International Search Report , PCT Application No. PCT/US 95/12681,(mailed Apr. 9, 1996),8 p.

"Answers to Frequently Asked Questions About Network Security", *Secure Computing Corporation*, (Sep. 25, 1994),p. 1-41 & p. 1-16.

"Sidewinder Internals", Product information, Secure Computing Corporation,(Oct. 1994),16 p.

"Special Report: Secure Computing Corporation and Network Security", *Computer Select*, (Dec. 1995),13 p.

Adam, J. A., "Meta-Matrices", *IEEE Spectrum*, 29(10), Excerpt from article "Electronic mail-E-mail at work" (pp. 24-28),(Oct. 1992), 26-27.

Adam, J. A., "Playing on the Net", *IEEE Spectrum*, 29(10), Excerpt from article "Electronic mail-E-mail at work" (pp. 24-28),(Oct. 1992),29.

Ancilotti, P., et al., "Language Features for Access Control", *IEEE Transactions on Software Engineering, SE-9*, (Jan. 1983),16-25.

Badger, Lee , et al., "Practical Domain and Type Enforcement for UNIX", *Proceedings., 1995 IEEE Symposium on Security and Privacy*, (May 8-10, 1995),66-77.

Belkin, N. J., et al., "Information Filtering and Information Retrieval: Two Sides of the Same Coin?", *Communications of the ACM*, 35, (Dec. 1992),29-38.

Bellovin, S. M., et al., "Network Firewalls", *IEEE Communications Magazine*, 32(9), (Sep. 1994),50-57.

Bevier, William R., et al., "Connection Policies and Controlled Interference", *Proceedings of the Eighth IEEE Computer Security Foundations Workshop*, Kenmare, Ireland,(Jun. 13-15, 1995),167-176.

Boebert, W. E., et al., "Secure Ada Target: Issues, System Design, and Verification", *Proceedings of the IEEE Symposium on Security and Privacy*, Oakland, California,(Apr. 22-24, 1985),59-66.

Boebert, W. E., et al., "Secure Computing: The Secure Ada Target Approach", *Scientific Honeyweller*, 6 (2), (Jul. 1985),42-58.

Bowen, T. F., et al., "The Datacycle Architecture", *Communications of the ACM*, 35, (Dec. 1992),71-81.

Bryan, J., "Firewalls For Sale", *BYTE*, (Apr. 1995),99-100, 102, 104.

Damashek, Marc., "Gauging Similarity with n-Grams: Language-Independent Categorization of Text", *Science*, 267, (Feb. 10, 1995),843-848.

Dillaway, B. B., et al., "A Practical Design For A Multilevel Secure Database Management System", *American Institute of Aeronautics and Astronautics, Inc.*, (Dec. 1986),p. 44-57.

Fine, Todd, et al., "Assuring Distributed Trusted Mach", *Proceedings of the IEEE Computer Society Symposium on Research in Security and Privacy*, (1993),p. 206-218.

Foltz, P. W., et al., "Personalized Information Delivery: An Analysis of Information Filtering Methods", *Communications of the ACM*, 35, (Dec. 1992),51-60.

Goldberg, D., et al., "Using Collaborative Filtering to Weave an Information Tapestry", *Communications of the ACM*, 35, (Dec. 1992),61-70.

Grampp, F. T., "UNIX Operating System Security", *AT&T Bell Laboratories Technical Journal*, 63, (Oct. 1984),1649-1672.

Haigh, J. T., et al., "Extending the Noninterference Version of MLS for SAT", *Proceedings of the 1986 IEEE Symposium on Secuirty and Privacy*, Oakland, CA,(Apr. 7-9, 1986),p. 232-239.

Hoffman, L. J., et al., "Security Pipeline Interface(SPI)", *IEEE*, (1990),349-355.

Kent, S. T., "Internet Privacy Enhanced Mail",*Communications of the ACM*, 36, (Aug. 1993),48-60.

Lampson, B. W., et al., "Dynamic Protection Structures", *AFIPS Conference Proceedings*, 35, 1969 Fall Joint Computer Conference, Las Vegas, NV,(Nov. 18-20, 1969),27-38.

Lee, K. C., et al., "A Framework for Controlling Cooperative Agents", *Computer*, (Jul. 1993),8-16.

Lodin, S. W., et al., "Firewalls Fend Off Invasions from the Net", *IEEE Spectrum*, (Feb. 1998),26-34.

Loeb, S., "Architecting Personalized Delivery of Multimedia Information", *Communications of the ACM*, 35, (1992),39-50.

Loeb, S., et al., "Information Filtering", *Communications of the ACM*, 35, (Dec. 1992),26-28.

McCarthy, S. P., "Hey Hackers! Secure Computing Says You Can't Break into This Telnet Site", *Computer Select*, (Dec. 1995),2 p.

Merenbloom, P., "Network 'Fire Walls' Safeguard LAN Data from Outside Intrusion", *Infoworld*, (Jul. 25, 1994),p. 69 & addnl page.

Metzger, P., et al., "IP Authentication using Keyed MD5", Network Working Group, Request for Comments No. 1828, http//ds.internic.net/rfc/rfc1828.txt,(Aug. 1995),6 p.

Mills, David L., "Network Time Protocol (Version 3) Specification, Implementation and Analysis", *University of Delaware Network Working Group*, (Mar. 1992),1-48.

Obraczka, K., et al., "Internet Resource Discovery Services", *Computer*, (Sep. 1993),8-22.

Press, L., "The Net: Progress and Opportunity", *Communications of the ACM*, 35, (Dec. 1992),21-25.

Schroeder, M. D., et al., "A Hardware Architecture for Implementing Protection Rings", *Communications of the ACM*, 15, (Mar. 1972),157-170.

Schwartz, M. F., "Internet Resource Discovery at the University of Colorado", *Computer*, (Sep. 1993),25-35.

Smith, R. E., "Constructing a High Assurance Mail Guard", Secure Computing Corporation (Appeared in the Proceedings of the National Computer Security Conference),(1994),7 p.

Smith, Richard E., "Sidewinder: Defense in Depth Using Type Enforcement", *International Journal of Network Management*, (Jul.-Aug. 1995),p. 219-229.

Stadnyk, I., et al., "Modeling User's Interests in Information Filters", *Communications of the ACM*, 35, (Dec. 1992),49-50.

Stempel, Steffen, "IpAccess—An Internet Service Access System for Firewall Installations", *1995 Symposium on Network and Distributed System Security (SNDSS'95)*, (1995),31-41.

Stevens, C., "Automating the Creation of Information Filters", *Communications of the ACM*, 35, (Dec. 1992),p. 48.

Thomsen, D. J., et al., "A Comparison of Type Enforcement and Unix Setuid Implementation of Well-Formed Transactions", *IEEE*, (1990),304-312.

Thomsen, D., "Type Enforcement: The New Security Model", *SPIE*, 2617, (1995),143-150.

Warrier, Unnikrishnan S., et al., "A Platform for Heterogeneous Interconnection Network Management", *IEEE Journal on Selected Areas in Communications*, 8, (Jan. 1990),119-126.

White, Lee J., et al., "A Firewall Concept for Both Control-Flow and Data-Flow in Regression Integration Testing", *IEEE Conference on Software Maintenance, Proceedings*, (Nov. 9-12, 1992),262-271.

Wolfe, A., "Honeywell Builds Hardware for Computer Security", *Electronics*, (Sep. 2, 1985),14-15, 17.

Atkinson, R., "IP Authentication Header", *Network Working Group, Request For Comment No. 1826*, http//ds.internic.net/rfc/rfc1826.txt, (Aug. 1995),11 pages.

Atkinson, R., "IP Encapsulating Security Payload (ESP)", *Network Working Group, Request for Comment No. 1827*, http//ds.internic.net/rfc/rfc1827.txt, (Aug. 1995),12 pages.

Atkinson, R., "Security Architecture for the Internet Protocol", *Network Working Group, Reqest for Comment No. 1825*, http//ds.internic.net/rfc/rfc1825.txt, (Aug. 1995),21 pages.

Baclace, P. E., "Competitive Agents for Information Filtering", *Communications of the ACM*, 35, (Dec. 1992),p. 50.

Cobb, S., "Establishing Firewall Policy", *IEEE*, (1996),198-205.

Gassman, Bill, "Internet Security, and Firewalls Protection on the Internet", *IEEE*, (1996),93-107.

Greenwald, Michael, et al., "Designing an Academic Firewall: Policy, Practice, and Experience with SURF", *IEEE*, (1996),79-92.

Hong, Jack, et al., "Personal Electronic Notebook with Sharing", *IEEE/IEE Publications*, (1995),88-94.

Karn, P., et al., "The ESP DES-CBC Transform", Network Working Group, Request for Comment No. 1829, http//ds.internic.net/rfc/rfc1829.txt,(Aug. 1995),9 p.

Peterson, L. L., et al., *In: Computer Networks*, Morgan Kaufmann Publishers, Inc., San Francisco, CA,(1996),p. 218-221, 284-286.

| DOMAIN → \ TYPE → | UNFIL DATA | FIL DATA | CLIENT PGM | FLTR PGM | NET PGM |
|---|---|---|---|---|---|
| LOCAL | RW | ////// | RE | ////// | ////// |
| FILTER | R | RW | ////// | RE | ////// |
| INTERNET | ////// | R | ////// | ////// | RE |

R: READ ONLY
RW: READ AND WRITE
RE: READ AND EXECUTE
//// : NO ACCESS ALLOWED

FIG. 5B

| Subype | Source Code Name | Usage |
|---|---|---|
| file | file | Files that are private to the creating Domain. |
| directory | diry | Directories; not checked. |
| socket | sock | Reserved. |
| fifo | fifo | Fifos; not checked. |
| device | devi | Reserved. |
| port | port | Reserved. |
| executable | exec | Executable; effective Domain is not changed. |
| gate | gate | Executable; effective Domain is set to creator field of full Type name for duration of execution. |

FIG. 6

| Attribute Name | Meaning |
| --- | --- |
| ddt_read | Process may read (fetch) data from object. |
| ddt_write | Process may modify object. |
| ddt_rename | Process may rename object. |
| ddt_exec | Process may execute contents of object. Will only by assigned to subtypes gate and exec and will never be combined with ddt_write. |
| ddt_trigger | Trigger an alarm signal to Rover monitoring facilities as a side effect of granting access. |
| ddt_chcreator | If effective Domain of the process = creator field of Type, then process can change creator field. |
| ddt_destroy | Process may destroy the object. |

FIG. 7

| Syscall | Type of Executable Argument | Old Real Domain | Old Effective Domain | New Real Domain | New Effective Domain | Remarks |
|---|---|---|---|---|---|---|
| fork | No Argument | Mail | Mail | Mail | Mail | Child Process Spawned |
| execve | Mail:exec | Mail | Mail | Mail | Mail | New Executable |
| execve | $Sys:exec | Mail | Mail | Mail | Mail | New Executable |
| make domain in with MIME as domain name | Mail:exec | Mail | Any | MIME | MIME | New Executable, as with execve |
| make domain with MIME as domain name | SMTP:gate | Mail | Any | MIME | SMTP | New Executable, as with execve |
| change domain with MIME as domain name | No Argument | Mail | Any | MIME | MIME | Continue With Same Executable |
| execve | SMTP:gate | Mail | Any | Mail | SMTP | Implicit Gating, New Executable |
| gate with SMTP as domain name | No Argument | Mail | Any | Mail | SMTP | Explicit Gating, Continue With Same Executable |
| ungate | No Argument | Mail | SMTP | Mail | Mail | Explicit Exit from Gate |

FIG. 8

| Privilege Name[a] | Meaning |
|---|---|
| can_ch_type | Can execute the ch_type or fch_type syscalls. |
| suppress_su_alarm | Can exercise super-user privilege without tripping alarm. |
| admin_reboot | Can transition to admin ("Greendome") mode. |
| can_set_clock | Can set or adjust the system clock. |
| can_setlogin | Can set user login name. |
| is_startup | Can perform functions required for startup only. | a. Note that there is no "can_ch_domain" privilege: the ability to change either the real or effective Domain of a process is controlled by the DIT.

FIG. 9

$D_0$
$D_1$ → LIST OF ALLOWED $D_E$
$D_2$     THAT $D_1$ CAN GATE INTO
$D_3$
...
...
$D_C$
*

FIG. 11

SYSTEM AND METHOD FOR PROVIDING SECURE INTERNETWORK SERVICES VIA AN ASSURED PIPELINE

RELATED APPLICATIONS

This application is a continuation of U.S. patent application Ser. No. 10/854,602, filed May 26, 2004, now issued as U.S. Pat. No. 7,181,613, which is a continuation of U.S. patent application Ser. No. 09/221,662, filed Dec. 23, 1998, now issued as U.S. Pat. No. 6,772,332, which is a continuation of U.S. patent application Ser. No. 08/322,078, filed Oct. 12, 1994, now issued as U.S. Pat. No. 5,864,683. All of these applications are incorporated herein by reference in their entirety.

BACKGROUND OF THE INVENTION

1. Field of the Invention

The present invention relates to computer security, and more particularly, to an apparatus and method for providing secure access to a wide-area network.

2. Background Information

Advances in computer and communications technology have increased the free flow of information within networked computer systems. While a boon to many, such a free flow of information can be disastrous to those systems which process sensitive or classified information. In a typical networked computer system, one or more workstations are connected over a network to a host computer or server. These workstations may range from low-cost personal computers to powerful UNIX processors. In such a system the workstations, servers and even the connecting networks may all be at great risk of a security breach.

In developing a strategy for reducing the potential and consequences of a security breach (i.e. a computer security policy), one must assume that competent and dedicated individuals will mount active attacks on the computer system's security mechanisms. These individuals are called the threat. The threat seeks to find vulnerabilities which can be exploited to cause a part of the computing system to operate in violation of its owner's security policy. Threats fall into two broad classes: Insiders and Outsiders.

Insiders are those individuals who have been granted some level of legitimate privilege and then abuse that privilege. An example of an insider in the noncomputer world is a bookkeeper who uses his or her legitimate access to account records to embezzle. An example in the computer world is a systems administrator who uses his or her legitimate access to a computer system to generate fraudulent billings, payable to a corporation owned by the administrator. Concern for insider actions also extends to individuals who, through ignorance, incompetence or improper direction, cause security policy to be violated intentionally.

Outsiders are those individuals who have no legitimate privilege on the system but who can exploit vulnerabilities to gain access to it. An example of an outsider in the noncomputer world is a burglar, who exploits weaknesses in locks and alarms to steal from a safe or lockbox. An example of an outsider in the network world is the "hacker" who takes control of a networked computer away from its legitimate owners.

The risk of security breach is compounded when a pathway is provided from the internal, private network to an external wide-area network such as the Internet. The Internet is a loose conglomeration of networks connected by a standard network protocol. The lure of access to the Internet is the vast amounts of information that can be accessed by the user; the danger is that there are little or no controls on what individuals have access to and what they may do with that access. Therefore, access to the Internet can provide an open door for exploitation of your own network by a variety of threats.

In effect, a wide-area network such as the Internet serves as a threat multiplier. Networks such as the Internet have evolved as fora for the free exchange of ideas. This fact can be exploited by threats seeking to access or subvert a private network. For instance, the global connectivity of such a network means that data taken from a private network can be moved around the world very quickly. To compound this problem, the Internet contains a number of very large data archives which can be used to store data transferred or posted from private networks. Hackers have also used the global connectivity of wide-area networks such as the Internet to directly manipulate computer facilities on the internal network (by such mechanisms as trying unlikely combinations of requests or commands) or to inject malicious software into the machine. Malicious software, which is able to do the threat's bidding remotely and without direct control, can be injected manually or by such technical mechanisms as "viruses" or "worms." (One such self-replicating piece of malicious software was responsible for a well publicized attack on computers connected to the Internet a few years ago.)

Internet protocols that have been developed to-date were not designed for security. For instance, Usenet news can be used by ignorant or disgruntled employees to post company proprietary information in publicly accessible space. In some cases, this posting can be done anonymously (e.g. by using an anonymous file transfer mode or by posting the data to an anonymous server). In addition, the proprietary nature of data may be obscured by encrypting the data via one of a number of free, easily accessible cryptographic packages.

In addition, since the standard Unix password is reusable, it is subject to capture and abuse by outsider threats. For instance, the use of reusable passwords means that each password is vulnerable to being "sniffed out" and captured. Once captured the password can be used by an inside or an outside threat to gain access to a site. In addition, if the password belongs to someone with administrative privilege, the threat can use the captured password to gain administrative privileges on the internal network. The threat can then use that privilege to install a permanent "trapdoor" in order to ensure future access.

This combination of features makes the Internet particularly vulnerable to attack. A potential buyer of stolen information can anonymously post a solicitation along with his public key; potential sellers can then encipher the information desired with that public key and post it, secure in the knowledge that only the solicitor will be able to decipher it.

The existence of an active threat places requirements on a private network which are significantly different from the superficially similar problem of providing reliable service. A reliability engineer can take advantage of the low probability of certain phenomenon, and choose not to respond to them because they are so unlikely. A security engineer cannot do this; a vulnerability, however obscure and unlikely, will be actively sought out by the threat, publicized to persons of like mind, and exploited over and over once discovered. Countermeasures must therefore be developed which effectively close, or prevent the exploitation of, each system vulnerability.

A number of countermeasures have been proposed to reduce the vulnerability of networked systems. These countermeasures share three characteristics:

1) It takes a secret to keep a secret. All information security mechanisms are based on the use of secrets which are shared by authorized individuals an kept from unauthorized ones. The secrets may be transformed, compressed or hidden inside protected hardware, but in every security architecture there is one set of values, which, if known, would lead to the compromise of the whole system.

2) Vulnerabilities always exist. It is no more possible to achieve perfect security than it is to achieve perfect reliability; in fact, it is much less possible because you must assume that the threat is actively working to discover the system vulnerabilities.

3) Threats escalate continuously. Installation of a given set of countermeasures does not eliminate the threat; it simple spurs it on to greater efforts to find ways of circumventing them.

These three common factors then pose the following problems for the countermeasures engineer:

1) Protecting the secrets that keep the secrets. This is highest priority requirement, for loss of these values would lead to catastrophic breaches of security.

2) Making vulnerabilities hard to find. The embodiment of the security mechanisms must be such that it is difficult for the threat to obtain details of their operation, or instances of them on which experiments may be performed.

The countermeasures proposed to date have focused on either preventing the transfer of data or on encrypting the data using known cryptographic methods in order to render it more difficult to compromise.

One method proposed for the prevention of unauthorized exploitation of the private network by inside or outside threats is an Internet "firewall". "Firewalls" implement a security policy based on the routing information contained in individual packets transferred to and from the wide-area network. They look only at the headers of the packets and then make decisions based on where the packet is going and where it came from. Typically, "firewalls" direct packets to a dedicated application machine which has a limited configuration of software. This application machine is then connected to a second router that limits its access to a specific set of internal systems.

A typical Internet "firewall" system 10 is shown in FIG. 1. In FIG. 1, system 10 includes a router 12 connected over an internal network 14 to workstations 16 and 18. Router 12 is also connected to a wide-area network 20 such as the Internet. Router 12 runs Internet "firewall" software intended to inspect packet based traffic and remove or reroute packets meeting a predefined criteria.

"Firewalls" are header sensitive, not content sensitive. Therefore they are subject to various forms of attack. For instance, a hacker 22 may construct a packet having a header which looks like a header passed by the firewall. Such a packet will slip unnoticed past router 10 and onto one or more workstations 16, 18. In addition, a threat 24 may be able to access sensitive data on network 14 through the file transfer protocol ("FTP"). As noted above, a buyer 26 of stolen data may use Usenet news to solicit transfer of proprietary data from venal or disgruntled employees. Finally, a threat 28 may work in conjunction with a subverted employee 30 to transfer proprietary information via encrypted electronic mail or anonymous FTP.

Therefore, the Internet firewall approach has the following disadvantages:

1) This approach is vulnerable to attacks which construct fake header information (such as that by hacker 22 above). The theory of such attacks is well known; it is only a matter of time before turnkey scripts for mounting them become globally available on the Internet.

2) A "firewall" is an "all-or-nothing" approach to security. If an attacker gets through the "Firewall", then the internal network on the other side lies naked and unprotected against effectively undetectable trojan horse attacks.

3) "Firewalls" can be difficult to configure correctly and even more difficult to keep secure because they have to be reconfigured as you modify your internal network.

4) "Firewalls" cannot make security decisions based on data content, because they only see the data after it has been cut into packets and rearranged in the course of transmission.

5) "Firewalls" limit, in arbitrary and irrational ways, the user's ability to interact with the Internet.

6) "Firewalls" require special "proxy" software for many Internet services. This means that there is a slow and costly development step required to "secure" a new service using the "Firewall" technique.

7) "Firewalls" require extra hardware and network connections, which increases cost and administrative overhead.

The cryptographic countermeasures proposed to date have focused on encrypting the data using known cryptographic methods in order to render it more difficult to compromise. Cryptography operates by performing mathematical transforms on data so that it is rendered unintelligible to an outside observer. In order for the data to be retrieved, the transform is based on a second set of values called keying material. It is the keying material that is, in this case, the secret that keeps the secrets. Since both the writer and the authorized reader of the data must have equivalent keying material, the central problem in cryptography is key management: the safe and reliable delivery of equivalent keying material to both ends of the writer-reader axis.

Cryptographic transforms use mathematical algorithms of great complexity and sophistication. In order to provide real-world security it is also necessary, however, that the embodiment or implementation of the algorithm be not only correct but also free of vulnerabilities or side effects which can be exploited by the threat.

One commonly used class of cryptographic algorithms is called secret-key or symmetric. Such algorithms are called symmetric because the same element or value of keying material is used both to encipher (scramble) and to decipher (unscramble). They are called secret-key because that keying material must be kept secret at both the writer and the reader ends of a communication. Secret-key systems require a some degree of prearrangement between the writer and the reader, so that the identical values of keying material are in place in advance of communication. As such, secret-key cryptography is most suited for communication amongst a closed community, where membership in the community is known a priori. Simple changes in key distribution patterns can be used to add or delete individuals from the community.

Another class of cryptographic algorithms is called public-key or asymmetric. Such algorithms are called asymmetric because two mathematically related elements of keying material are required: a public key, which is used to encipher but which cannot be used to decipher (unscramble), and a private key, which is the only value that can decipher. The corresponding private key, which is the secret that keeps the secret, is closely held. The public key, since it cannot be used to decipher, can be widely disseminated. By this means a secret message can be sent without explicit prearrangement: the writer obtains the reader's public key from some service akin to a telephone directory, enciphers the message, and sends it with the knowledge that only the reader holds the private key that can decipher it.

A form of public-key algorithm can also be used to authenticate, or sign, data. In this operation the private key is used to compute a value which is mathematically related to the data, called a digital signature. The private key is used so that only the holder of that private key can establish the distinctive value of the signature. The mathematics of the operation are such that the corresponding public can be used to determine the validity of the signature. Thus only one person can sign, but any individual with access to the public key service can check the signature.

Public-key cryptography is most suited for communication within an open community, where it is desired to have secret and/or authenticated communication without prior arrangement. Adding individuals to the community is relatively simple, but deleting individuals is difficult.

Cryptography has the following uses in information security:

1) Protection of communications links where the transmissions can be easily intercepted.

2) Protection of electronic mail where the messages may be forwarded through sites not under the control of the writer or the authorized reader of the message.

3) Protection of data stored on removable media or media which is exposed to the possibility of physical theft.

4) Authentication, where the knowledge of a shared secret is used to verify the identity of an individual or a machine.

The most sophisticated approaches to protecting data transferred over the unsecured Internet network are through the application of Global Cryptography at the Client workstation, so that data is enciphered at the source and deciphered at its destination. The principal application of this approach is to electronic mail. Global Cryptography can be implemented in software, as in the Privacy Enhanced Mail system, or in personal tokens which combine the cryptographic mechanisms with an individual's certificate, as in the MOSAIC program.

A less sophisticated approach is to apply the cryptography only on the wide-area network. Historically, there have been two ways to do this, called Link Encryption and End-to-End Encryption.

In the Link Encryption approach, all bits coming out of a network node and onto the network are enciphered. This requires that the destination node have an identical cryptographic device and compatible keying material with the source. The disadvantage of link encryption is that all bits are encrypted, including those used to route packets over a packet-switched network. This effectively prevents a packet-switched network from working.

To permit the use of cryptography over packet-switched networks, the technique of End-to-End Encryption was devised. In this technique, only the packet contents are encrypted, and the critical routing information is left as plaintext. The "ends" in End-to-End encryption are typically multi-user servers and not individual workstations, so that the problem of getting compatible keying material at each end is reduced to manageable proportions.

Neither data encryption nor the use of Internet "firewalls" address the array of vulnerabilities inherent to connection of an internal, private network to an external, wide-area network such as the Internet. What is needed is a comprehensive and integrated security policy and apparatus for preventing exploitation of private network resources by both internal and external threats.

SUMMARY OF THE INVENTION

The present invention provides a secure wide-area access system comprising a secure computer, an internal network and a workstation connected across the internal network to the secure computer. The secure computer comprises an internal network interface, a public network interface, public network program code used to communicate through the public network interface to a public network, private network program code used to communicate through the internal network interface to the workstation and security policy program code for enforcing a Type Enforcement security mechanism to restrict access of a process to data.

According to another aspect of the present invention, a method of protecting a computer system connected to an unsecured external network is described. The method comprises the steps of providing a secure computer, wherein the secure computer comprises security policy program code for enforcing a Type Enforcement security mechanism to restrict access of a process to data, connecting the Type Enforcement based secure computer to the private network and establishing an assured pipeline for the transfer of data and programs between the private network and the external network through the secure computer. The step of establishing an assured pipeline includes the steps of placing processes within domains, wherein the step of placing processes within domains includes the step of assigning processes received from the external network to an external domain, assigning types to files and restricting access by processes within the external domain to certain file types.

According to yet another aspect of the present invention, a secure server is described for use in controlling access to data stored within an internal network. The secure server comprises an administrative kernel and an operational kernel, wherein the operational kernel includes security policy program code for enforcing a Type Enforcement security mechanism to restrict access of a process received from the external network to data stored on the internal network and wherein the administrative kernel is restricted to execution only while isolated from the internal network.

According to yet another aspect of the present invention, the secure server comprises a processor, an internal network interface, connected to the processor, for communicating on an internal network and an external network interface, connected to the processor, for communicating on an external network. The processor includes server program code for transferring data between the internal and external network interfaces and security policy program code for enforcing a Type Enforcement security mechanism to restrict access of a process received from the external network to data stored on the internal network.

According to yet another aspect of the present invention, a system and method are described for the secure transfer of data between a workstation connected to a private network and a remote computer connected to an unsecured network. A secure computer is inserted into the private network to serve as the gateway to the unsecured network and a client subsystem is added to the workstation in order to control the transfer of data from the workstation to the secure computer. The secure computer includes a private network interface connected to the private network, an unsecured network interface connected to the unsecured network, wherein the unsecured network interface includes means for encrypting data to be transferred from the first workstation to the remote computer and a server function for transferring data between the private network interface and the unsecured network interface.

According to yet another aspect of the present invention, a system is described for secure internetwork communication across an unsecured network. First and second secure computers are connected to first and second private networks, respectively, and to each other across the unsecured network. The first and second secure computers include a private network interface and an unsecured network interface for secure transfer of data from the first secure computer to the second secure computer over the unsecured network. The unsecured network interface includes means for encrypting data to be transferred from the first secure computer to the second secure computer. A client subsystem is added to workstations connected to each private network in order to control the transfer of data from the workstation to the respective secure computer.

BRIEF DESCRIPTION OF THE DRAWINGS

FIGS. 5a and 5b show the Type Enforcement mechanism used to prevent access, modification and/or execution of data objects without permission in a system such as that shown in FIG. 3;

FIG. 6 is a table of source code names of subtypes;

FIG. 7 is a table of access attributes;

FIG. 8 is a table of the new and effective Domains which result from particular syscalls;

FIG. 9 is a table listing the privileges which may be granted to a Domain;

FIG. 11 is a representation of steps taken in determining from the DIT the Domains a process can change to;

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
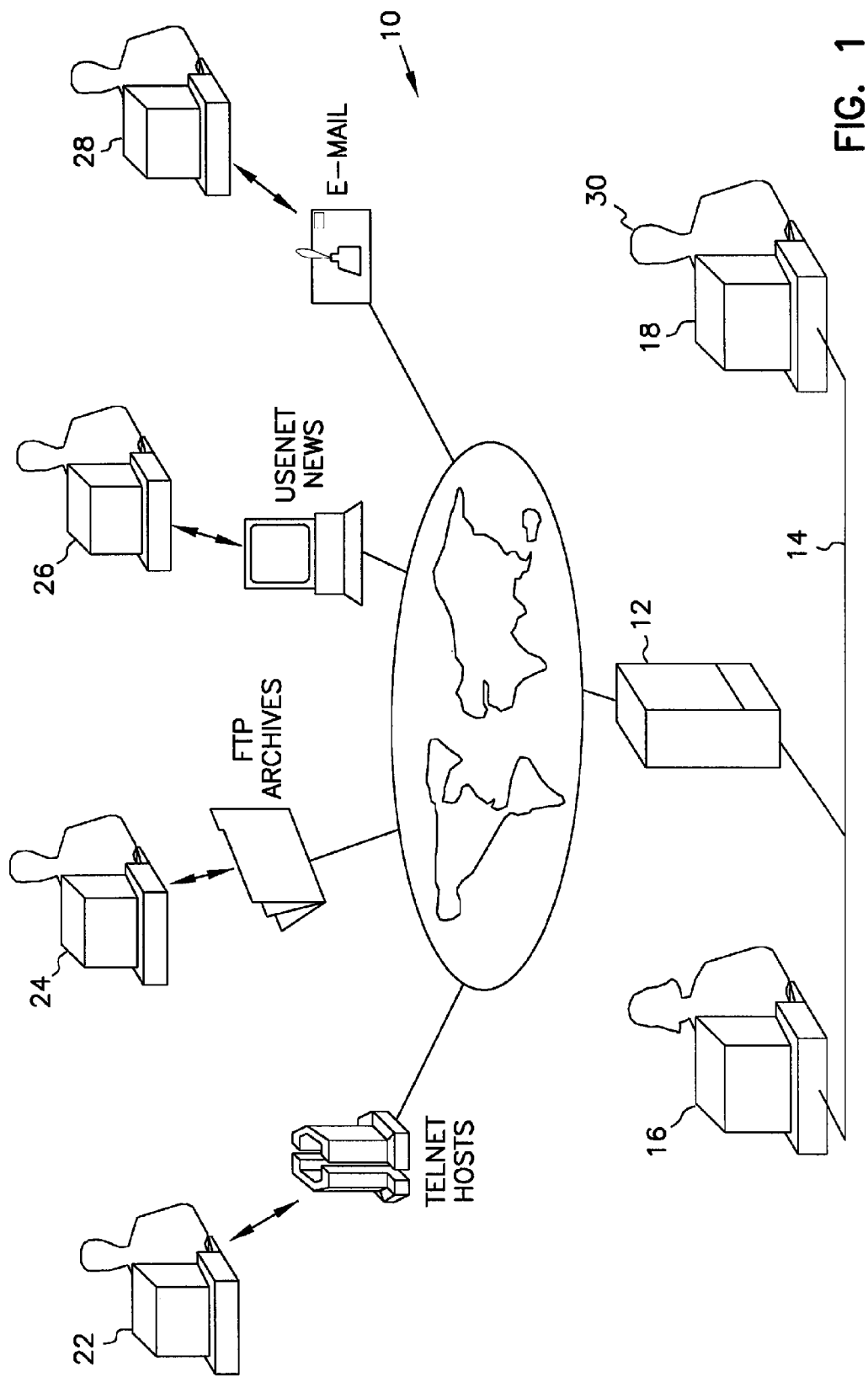
FIG. 1 is a representation of a router-based "firewall"
Figure 2:
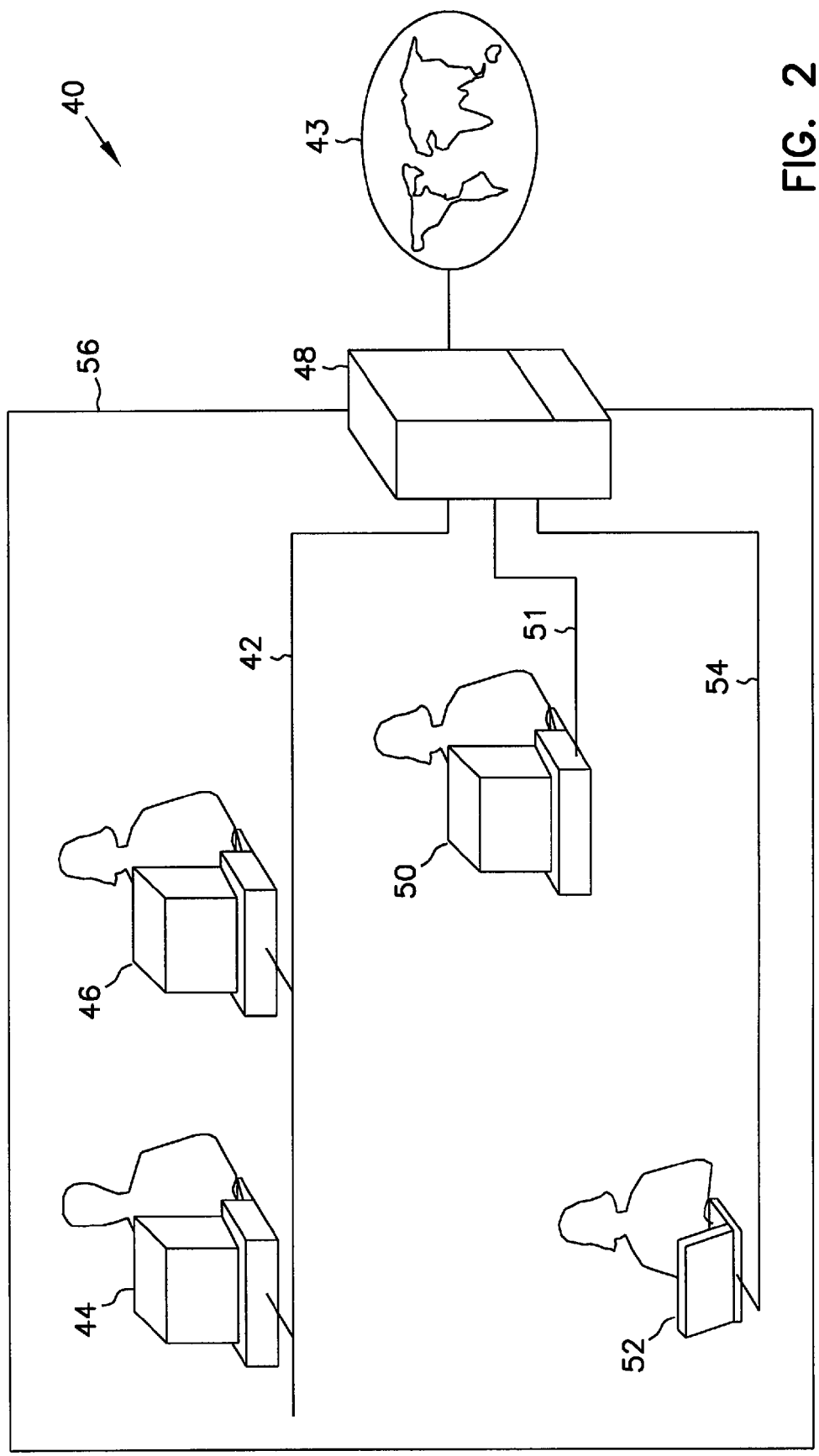
FIG. 2 is a system level block diagram representation of a secure wide-area access system according to the present invention.

A secure wide-area access system 40 is shown in FIG. 2. In FIG. 2, an internal network 42 connects workstations 44 and 46 to secure computer 48. Internal network 42 is separated from a wide-area network 43 (such as the Internet) by secure computer 48. Secure computer 48 is also connected to a system administrator workstation 50 through a dedicated line 51 and to a workstation 52 through a serial interface 54. Secure computer 48 and workstations 44, 46, 50 and 52 make up an organizational enclave 56 of data. The enclave is a "logical" enclave in that there is no requirement that the protected users and data be physically co-located, although such use of physical security measures is certainly possible.

It is important to isolate network 42 from network 43. To do this, secure computer 48 enforces an organizational security policy at the interface between internal network 42 and wide-area network 43. It must do so in the face of active threat from both insiders and outsiders, whether by direct manipulation, the insertion of malicious software, or a combination of both. The system must protect its clients against attacks from wide-area network 43, limit the damage done by subverted or incompetent clients, and be able to securely interact with clients of other systems 40 connected to wide-area network 43. It does this by surrounding the user with a set of protections that form organizational enclave 56.

Organizational enclave 56 consists of two main elements: a Client subsystem which operates on workstations 44, 46 and 52 and a set of servers and filters which operate on secure computer 48. In one embodiment, internal network 42 connecting each workstation 44 or 46 to secure computer 48 is protected and authenticated by Local Cryptography; Global Cryptography is used for protection and authentication on wide-area network 43.

Figure 3:
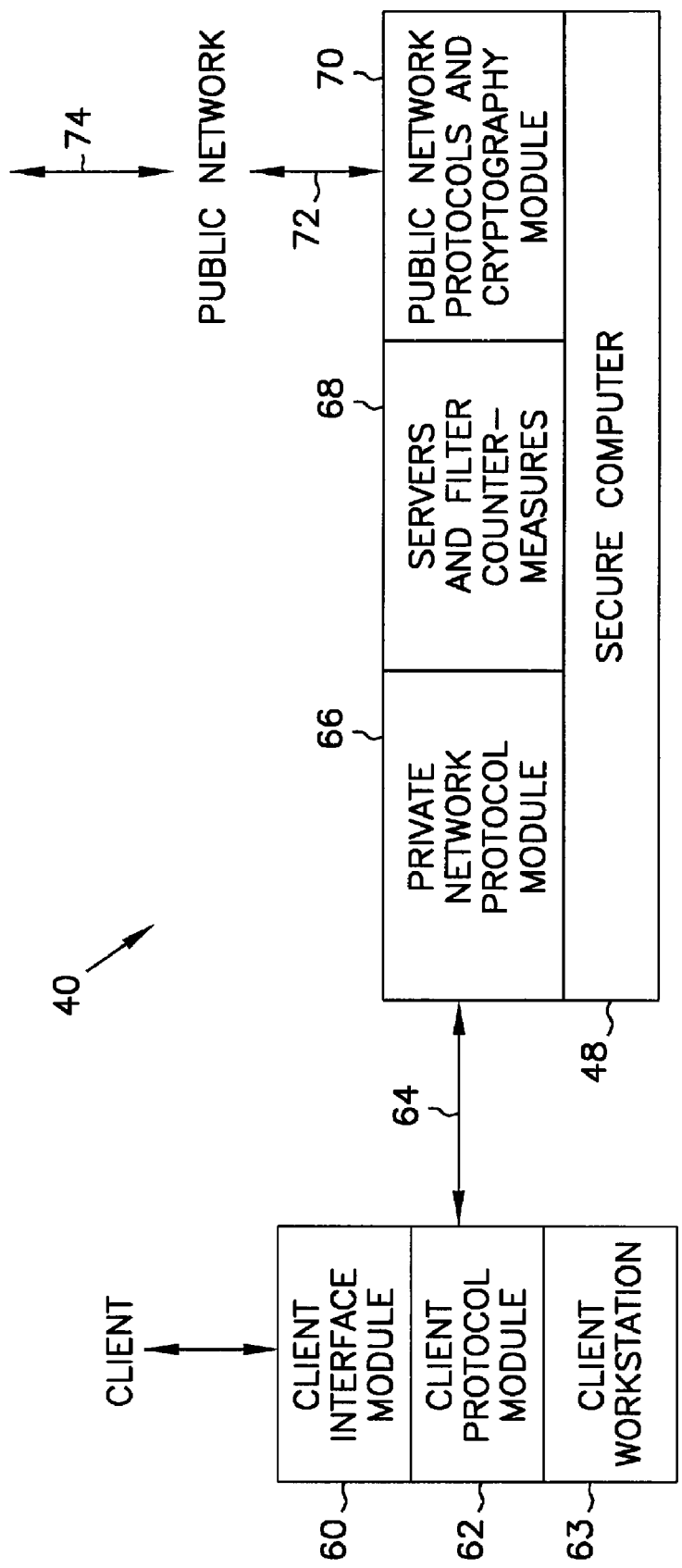
FIG. 3 is a more detailed block diagram representation of one embodiment of the networked computer system of FIG. 2.

FIG. 3 illustrates one embodiment of the secure wide-area access system 40 shown in FIG. 2. In FIG. 3, a workstation 63 (e.g. workstation 44, 46 or 52) connected to secure computer 48 over Private Network 64 (e.g. internal network 42 or serial interface 54) contains program code for communicating with secure computer 48 and through secure computer 48 to computers connected to wide-area network 43. Private Network 64 can be any means of communication, wired or wireless, which allows a workstation 63 to transfer data between the workstation and secure computer 48. In the example shown in FIG. 2, two embodiments of private network 64 are shown (internal network 42 and serial interface 54). It should be apparent that other embodiments of Private Network 64 can be implemented and the resulting system 40 would still fall within the scope of the present invention.

In one embodiment, the program code in workstation 63 includes a Client Interface Module 60 and a Client Protocol Module 62. Client Interface Module 60 accepts commands from, and displays results to, the user or Client. It can be embodied in a Graphical User Interface (GUI), a command line interface, or some combination of the two. Typical commands would be to prepare an electronic message, examine incoming messages, request files from other sites, or any other operations typical of computer network usage.

Client Protocol Module 62 implements the protocol used to communicate between workstation 63 and secure computer 48. Client Protocol Module 62 can be implemented in either software or hardware, or a combination of both. In one embodiment, a Local Cryptography function integrated into Protocol Module 62 has the specialized task of protecting and authenticating traffic on internal network 64 only. Different protocols and different cryptographic methods can be used for different Clients, depending on Client preferences and such factors as the nature of the physical connection (dialup, Local Area Network, etc.) between the Client Workstation and the Secure Computer. It is most likely, though not required, that the closed nature of an organizational Client community (i.e. organizational enclave 56) will favor the use of secret-key cryptography in this module. In one embodiment, the Local Cryptography function is implemented in software in order to take advantage of software's flexibility and interoperability advantages over hardware.

In another embodiment, the Local Cryptography function is implemented as a module separate from but operating in conjunction with Client Protocol Module 62.

In secure wide-area access system 40 of FIG. 3, program code running on secure computer 48 is used to communicate through Private Network 64 to Client Protocol Module 62. In the embodiment shown in FIG. 3, the program code used to communicate with Client Protocol Module 62 is part of Private Network Protocol Module 66. In such an embodiment, Module 66 runs on secure computer 48 and interacts with Client Protocol Module 62 to provide protected and authenticated communication with workstation 63.

Likewise, program code running on secure computer 48 is used to communicate through a Public Network interface 72 to Public Network 74 (e.g. the Internet). In the embodiment shown in FIG. 3, the program code used to communicate with Public Network 74 is part of Public Network Protocols and Cryptography Module 70. In such an embodiment, Module 70 runs on secure computer 48 and is used to provide protected and authenticated communication with individuals, sites, and other secure wide-area access systems 40 on Public Network 74. Different protocols and cryptographic methods may be used when communicating with different entities on Public Network 74. It is most likely, though not required, that the open nature of Public Network 74 will favor the use of public-key cryptography in this module.

Finally, program code running on secure computer 48 is used to implement servers and filter functions on secure computer 48. In the embodiment shown in FIG. 3, the program code used to implement the server and filter functions is part of Servers and Filters Countermeasures 68. As such, the servers and filter countermeasures operate on the secure computer 48. They provide user services, such as the delivery of electronic mail or the transfer of data files and also enforce the organizational security policy by filtering the transfer of information and intercepting disallowed contents, labels, and/or addresses.

Cryptography in Secure Systems

The principal requirement for secure use of cryptography is a safe and reliable method for distribution of keying material. Reliability is as important as safety because if the material is not available then the users of the system are faced with the unpleasant choice of either not using the cryptography (and thereby exposing their data to compromise or modification) or not transmitting. The key management requirements for a secret key system revolve around prearranged distribution of shared secrets. The key management requirements of public key systems revolve around insuring that the writer of a document to be enciphered obtains the public key which corresponds to the reader's private key. Since the consequences of obtaining the wrong public key can be a breach of security, public keys are digitally signed by a notary or local authority who attests to their validity. Such signed public keys, with other optional information about the holder of the corresponding private key, are called certificates.

Any effective key management system, and by extension any effective use of cryptography in a computer network, must also have facilities to solve the following problems:

1) Revocation. It must be possible to "take back" keying material so that an individual who was once authorized can have that authorization revoked.

2) Emergency rekey. It must be possible to "revive" the authorization of an individual if the keying material that grants the authorization is lost or destroyed.

3) Travelling user. The keying material that grants authorization to an individual must move around the network as the individual changes location.

Theoretically, the security of a cryptographic mechanism should rest only on the secrecy of critical keying material (all of it in a secret-key system, just the private part in a public-key system). As a practical matter, it is necessary to maintain protection of the mechanism for cryptography. This is especially true when the cryptographic device is partially or fully controlled by a computer system which may have been subverted through the use of malicious software. Such malicious software could cause the cryptographic device to be bypassed either physically, by routing sensitive data around it, or logically, by causing a coherent pattern to be imposed on the timing or other characteristics of the output. This is not a cryptographic problem per se, but rather one that arises in the systems context of cryptography combined with potentially vulnerable computers.

In the secure wide-area access system 40 of FIGS. 2 and 3, the burden of maintaining protection of the mechanism of cryptography is placed on secure computer 48. Secure computer 48 can be any type of machine whose features and/or implementation permits the operation of security-relevant functions to be trusted. Trusted computing systems have been proposed for limiting access to classified information to those who have a sufficient level of clearance. Such systems depend on identifying the user, authenticating (through password, biometrics, etc.) the user's identity and limiting that user's access to files to those files over which he or she has access rights. Such systems are described in U.S. Pat. Nos. 4,621,321; 4,713,753; and 4,701,840 granted to Boebert et al. and assigned to the present assignee.

Typically, secure computers such as secure computer 48 provide safeguards through specialized hardware and software from direct attack on program code running in the secure computer. They have been developed to meet the following two objectives:

1) Limiting the privilege of users in a shared, or multiuser computer installation, so that malicious users cannot cause damage or compromise, and the effect of user error is minimized; and 2) Preventing damage or compromise that could result from the execution of malicious or erroneous software.

There have been two approaches to achieve the latter objective: exclusion, which seeks to prevent malicious software from entering the machine, and confinement, which allows the software into the machine and seeks to limit its effects. Existing secure computers fall into three broad classes:

1) Multilevel Secure Computers, which apply a confinement policy modelled on the U.S. Department of Defense system of data classification and personnel clearances. A Multi-Level Secure (MLS) Computer is capable of recognizing data of varying sensitivity and users of varying authorizations and ensuring that users gain access to only that data to which they are authorized. For example, an MLS computer can recognize the difference between company proprietary and public data. It can also distinguish between users who are company employees and those who are customers. The MLS computer can therefore be used to ensure that company proprietary data is available only to users who are company employees.

2) Type Enforcing Secure Computers, which apply a confinement policy based on data flows through software subsystems in the machine.

3) Special Purpose Secure Computers, which apply an exclusion policy to insure that no malicious software is inserted in them, and then perform special-purpose security-related functions.

Secure wide-area access system 40 of FIGS. 2 and 3 can make use of any of these classes of machines, although it is most suited to being implemented on a Type Enforcing Secure Computer.

A freestanding Secure Computer has the following preconditions for secure use:

1) Protection of mechanism: the security mechanisms, especially those embodied in software, must be protected from tampering or unauthorized modification. Since software mechanisms are prone to frequent update and improvement, there is a requirement for trusted distribution, that is, a means whereby administrators can be confident that the software they are installing is correct and proper.

2) User authentication: the security mechanisms often decide whether or not to allow an action based on the individual on whose behalf the action is being taken. There must be a method whereby the identity of a user can be authenticated.

In the case of a freestanding Secure Computer, physical controls are typically sufficient to protect mechanism and simple methods such as passwords are sufficient to authenticate user identities. Designers of secure computers assume that unauthorized individuals will use a variety of means, such as malicious code and active and passive wiretaps, to circumvent its controls. Trusted subsystems of a secure computer must therefore be designed to withstand malicious software executing on the untrusted subsystem, to confine the actions of malicious software and render it harmless. For instance, trusted computer systems based on host computers such as a Multilevel Secure (MLS) Computer make security breaches at the host computer more difficult by partitioning the system to isolate security critical (trusted) subsystems from nonsecurity critical (untrusted) subsystems. In a similar manner, in Type Enforcing (TE) Secure Computers executables residing within the secure computer can only be executed if the person requesting execution has execution privileges for that executable object. A further level of security can be achieved by preventing execution of any executable objects that have not been expressly recognized as a trusted executable by a trusted executable or by a system administrator.

In one embodiment of a TE-based system 40, only trusted executables are permitted to execute within secure computer 48. In such an embodiment, executables must first be reviewed and validated by a system administrator before they will be granted execution privileges on secure computer 48.

Secure computers do little, however, to prevent security breaches on the private network or at the workstation. One mechanism for avoiding such a breach is to authenticate the client to the secure computer over the network. The Local Cryptography function described above performs such a client authentication function. Another mechanism for avoiding a network-related breach is to invoke a trusted path, a secure communications path between the user and the trusted subsystem. A properly designed trusted path ensures that information viewed or sent to the trusted subsystem is not copied or modified along the way. A trusted path authenticates not only the client to secure computer 48 (as in Local Cryptography above) but also authenticates secure computer 48 to the client. As such, the trusted path mechanism guarantees that a communication path established between the trusted subsystem on secure computer 48 and the user cannot be emulated or listened to by malicious hardware or software.

Extension of the trusted path through the network to the user is, however, difficult. As is described in a previously filed, commonly owned U.S. patent application entitled "Secure Computer Interface" (U.S. Pat. No. 5,272,754 issued Dec. 21, 1993 to William E. Boebert), "active" and "passive" network attacks can be used to breach network security. Active attacks are those in which masquerading "imposter" hardware or software is inserted into the network communications link. For example, hardware might be inserted that emulates a user with extensive access privileges in order to access sensitive information. "Passive" network attacks include those in which a device listens to data on the link, copies that data and sends it to another user. The '754 patent describes a system and method for ensuring secure data communications over an unsecured network. Operation of a trusted path in conjunction with an organizational enclave is described in U.S. Pat. No. 5,276,735, issued Jan. 4, 1994 to Boebert et al.

In one embodiment, therefore, communication between Client Protocol Module 62 and Private Network Protocol Module 66 is made secure through the establishment of a Trusted Path between workstation 63 and secure computer 48 for all critical transfers.

Security Policy Within the Secure Wide-Area Access System

The term security policy has acquired two meanings in the art:

1) The statement used by organizations and individuals to describe the objectives of their security activity, and to assign roles and responsibilities.

2) The rules used by a Secure Computer to determine whether or not certain actions may be performed.

In the latter case there are two kinds of policies:

2*a*) Label-based, in which the decisions are made on the basis of tag, or internal label, which is associated with a data object such as a file. The contents of the file are not examined by the decision-making mechanism.

2*b*) Content-based, in which the decisions are made on the basis of the contents of the file, message, or other data object.

Secure computers are required to perform the following tasks:

1) Protect data while it is being processed in unencrypted form. Certain operations, such as computations, editing, and transformation from one electronic message format to another can only be performed on data in unencrypted or cleartext form. Operations in encrypted, or ciphertext form, are generally limited to storage and transmission.

2) Enforce content-based security policies. Since such enforcement requires examination of contents, those contents must be in intelligible plaintext form.

3) Enforce individual roles and control the exercise of privilege. Cryptography inherently provides a binary or "all or nothing" privilege mechanism: either one possesses a decryption key, in which case one can read the data and then do whatever one pleases with it, or one does not possess the decryption key and operations on the data are prevented.

In a computer network, cryptography requires the following services from a Secure Computer:

1) Reliable and safe key management and distribution, including enforcement of limited roles for privileged individuals.

2) Protection of cryptographic mechanism from abuse by malicious software.

Correspondingly, Secure Computers require the following services from cryptography:

1) Authentication of user identities.

2) Protection of software mechanisms through trusted distribution.

3) Protection of data during storage or transmission in exposed environments such as a Public Network.

Underlying Principles of the Secure Wide-Area Access System

The first principle of system 40 is that the security services and alarms are centralized in a protected facility (secure computer 48) which is under the administrative control of a limited number of authorized individuals. Secure computer 48 can, and in general will, be physically protected to prevent unauthorized tampering or modification. In this way a greater degree of trust can be placed in its operation that in the operation of Client workstations 63, which are exposed, and in some cases portable. Centralization means that security alarms are signalled only to authorized administrators who have privileges on secure computer 48; this facilitates response to insider attacks. Centralization also means that new services and countermeasures can be implemented simply by changing program code or hardware on secure computer 48; such changes will be immediately available to, and imposed upon, all Clients on Private Network 64.

Secure wide-area access system 40 distinguishes between local authentication and protection, which takes place within the more protected confines of a Private Network 64, and global authentication and protection, which takes place over a Public Network 74 shared with potentially hostile parties. All information is decrypted and examined in plaintext form by Filter Countermeasures 68 on secure computer 48. This permits the imposition of content-based organizational security policies and detailed audit of Client interactions with Public Network 74. It also permits the intelligent transformation of data from one format to another when crossing the boundary between the Private Network 64 and Public Network 74. This ability is especially important in the case of electronic mail, where a large number of incompatible formats are in place.

A Type Enforcing Secure Wide-Area Access System

Figure 4:
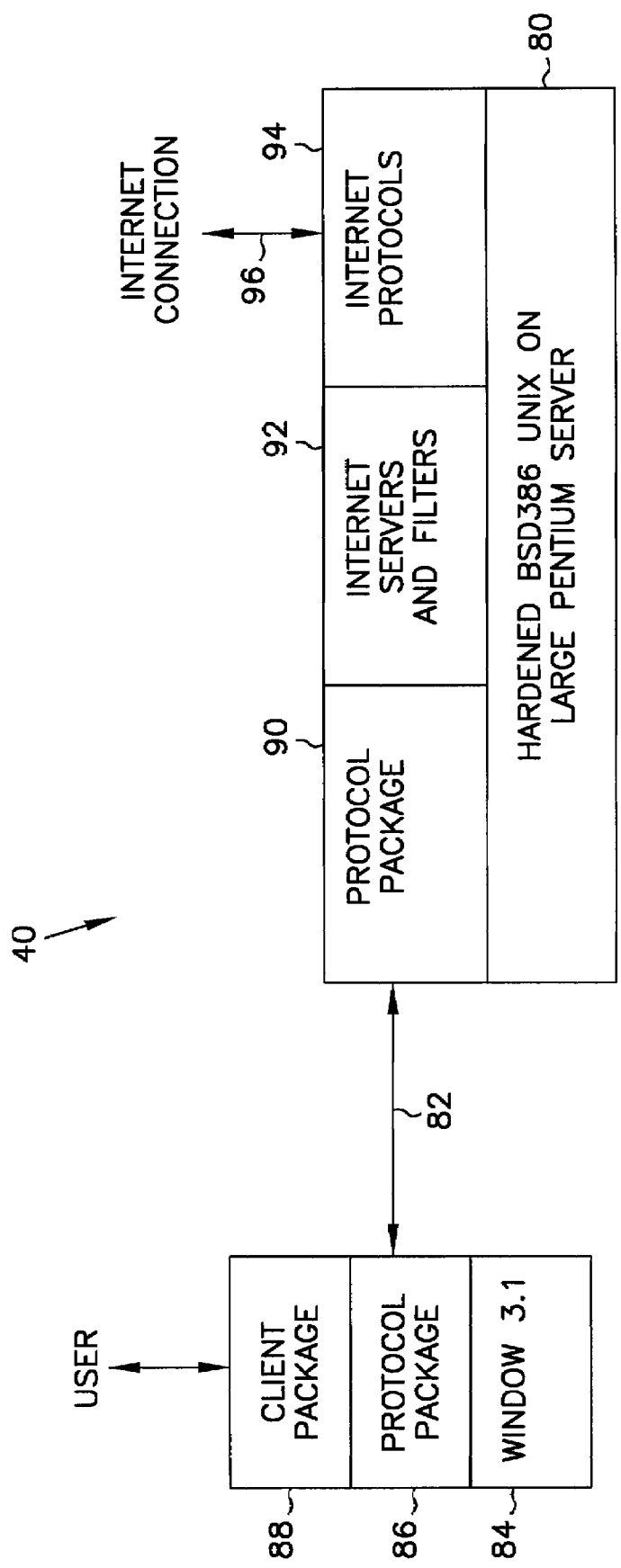
FIG. 4 shows one embodiment of the system of FIG. 3.

One embodiment of secure wide-area access system 40 of FIG. 3 is illustrated in the block diagram of FIG. 4. In FIG. 4, system 40 includes a secure computer 80 connected across a private network 82 to one or more workstations 84. Workstations 84 are Intel-based IBM compatible personal computers running Windows 3.1 on the Microsoft DOS operating system. Protocol package 86 implements the protocol used to communicate between workstation 84 and secure computer 80. In one embodiment, network 82 uses a TCP/IP protocol. In such an embodiment, protocol package 86 is a software package used to establish a WINSOCKET to network 82 on workstation 84. In one such embodiment, a Local Cryptography function is integrated into protocol package 88 in order to protect and authenticate traffic on network 82.

Client package 88 accepts commands from, and displays results to, the user or Client. It can be embodied in a Graphical User Interface (GUI), a command line interface, or some combination of the two. Typical commands would be to prepare an electronic message, examine incoming messages, request files from other sites, or any other operations typical of computer network usage.

In secure wide-area access system 40 of FIG. 4, program code running on secure computer 80 is used to communicate through Private Network 82 to protocol package 86. In one embodiment, secure computer 80 is an Intel Pentium-based machine running a hardened form of BSD386 Unix. A system based on a 90 MHz pentium with 32 megabytes of memory, 2 gigabytes of hard disk space, a DAT tape for backup and a CD-ROM for software loads has been found to be adequate.

In the embodiment shown in FIG. 4, the program code used to communicate with protocol package 86 is part of protocol package 90. In such an embodiment, package 90 runs on secure computer 80 and interacts with protocol package 86 to provide protected and authenticated communication with workstation 84. For instance, a Local Cryptography function may consist of software which executes on workstation 84 to establish client authentication at login. In such a system, when a user logs into network 82, a message is sent from workstation 84 to secure computer 80. Secure computer 80 responds with a number (in one embodiment, this is a seven digit number) which is sent unencrypted to protocol package 86 on workstation 84. Protocol package 86 then generates a request, through client package 88, to the user to enter his or her personal identification number (PIN). Protocol package 86 takes the PIN and combines it with a predefined number stored on workstation 84 to form a DES encryption key. That DES encryption key is then used to encrypt the number received from secure computer. The encrypted number is sent to secure computer 80, where it is decrypted. If the correct machine number and PIN number were used for that particular user, secure computer 80 will be able to reconstruct exactly the number it sent to workstation 84. If not, an error is generated and an entry is made in the audit log. In one embodiment, active spoofing countermeasures are then executed in an attempt to keep the threat in the vicinity of workstation 84.

Once the client is authenticated, communication on network 82 is in clear text.

Likewise, program code running on secure computer 80 is used to communicate through a Public Network interface to a Public Network. In the example shown in FIG. 4, the public network is the Internet. In such an embodiment, the program code used to communicate with the Internet is part of an Internet protocols 94 which communicates with computers on the Internet through Internet connection 96. Internet protocols 94 runs on secure computer 80 and is used to provide protected and authenticated communication with individuals, sites, and other secure wide-area access systems 40 over the Internet. Different protocols and cryptographic methods may be used when communicating with different entities on the Internet. In one embodiment, a tcp wrapper package operating in Internet protocols 94 is used to sit on the external, public network so that information about external probes can be logged. It is most likely that the open nature of Public Network 74 will favor the use of public-key cryptography in this module.

Finally, program code running on secure computer 80 is used to implement servers and filter functions on secure computer 80. In the example shown in FIG. 4, the program code used to implement the server and filter functions is part of Internet Servers and Filters 92. As such, the servers and filter countermeasures operate on secure computer 80. They provide user services, such as the delivery of electronic mail or the transfer of data files and also enforce the organizational security policy by filtering the transfer of information and intercepting disallowed contents, labels, and/or addresses.

As noted above, in one embodiment secure computer 80 is an Intel Pentium-based machine running a hardened form of Berkeley's BSD386 Unix. In that embodiment, BSD386 is hardened by adding a Type Enforcement mechanism which restricts the access of processes to data. Type Enforcement operates in conjunction with page access control bits in the virtual page translator of the Pentium to control access to objects stored in secure computer 80 memory. To accomplish this, system calls in the basic BSD386 kernel were modified as shown later in this document so that Type Enforcement checks cannot be avoided. Certain other system calls were either disabled or had certain options disabled.

In the hardened BSD386 according to the present invention, Type Enforcement controls are enforced by the kernel and cannot be circumvented by applications. Type Enforcement is used to implement data flow structures called Assured Pipelines. Assured pipelines are made possible by the so-called "small process" model of computation used by Unix. In this model, a computational task is divided up into small virtual units that run in parallel to each other. Unix provides a crude and loosely-controlled way of sharing data between processes. Type Enforcement supplants this with the rigorously controlled, configurable structure of assured pipelines.

In addition, secure computer 80 has been configured under BSD386 to run in one of two states: administrative and operational. In the administrative state all network connections are disabled and the Server will only accept commands from a properly authenticated System Administrator accessing the system from the hard-wired administrative terminal (such as terminal or workstation 50 in FIG. 2). This feature prevents anyone other than the System Administrator from altering the security databases in secure computer 80.

In the operational state the network connections are enabled and the Server will execute only software which has been compiled and installed as executable by an assured party.

The two states are reflected in two separate kernels. The administrative kernel is not subject to Type Enforcement. Instead, it is network isolated and accessible only to authorized personnel. This means that in administrative kernel mode, secure computer 80 cannot be seeded with malicious software by any but the people charged with system administration.

On the other hand, the operational kernel is subject to Type Enforcement. This means, for instance, that executable files stored in the memory of secure computer 80 cannot be executed without explicit execution privileges. In one such embodiment, executable files cannot be give execution privileges from within the operational kernel. Instead, secure computer 80 must enter administrative kernel to grant execution privileges. This prevents execution of malicious software posted to secure computer 80 memory. Instead, only executables approved by operational administrators while in administrative kernel mode ever become executable within operational kernel mode of secure computer 80. In such an embodiment, administrative kernel can be entered only from either a manual interrupt of the boot process to boot the administrative kernel or by booting secure computer 80 from a floppy that has a pointer to the administrative kernel.

These restrictions provide the following advantages:
  Defense in Depth: If an attacker should find a vulnerability in a system 40 subsystem, the damage that attacker can cause is limited to that subsystem. This prevents well-known attacks where a vulnerability in, e.g., the mail subsystem can be exploited to take over an entire installation.
  Silent Alarms: The Type Enforcement supersedes and constrains the traditional "root" and "superuser" privileges of insecure Unix. Attempts to exercise these privileges in system 40, or to violate other constraints of Type Enforcement, result in alarms being raised in administrative processes. No signal or indication of attack detection need be given, however. Instead, system 40 can, if desired, gather data to trace the source of the attack, feed false or misleading data to the attackers or take other appropriate countermeasures.
  Open Security Architecture: The modular design means new Internet services can be provided quickly and securely.

Figure 5A:
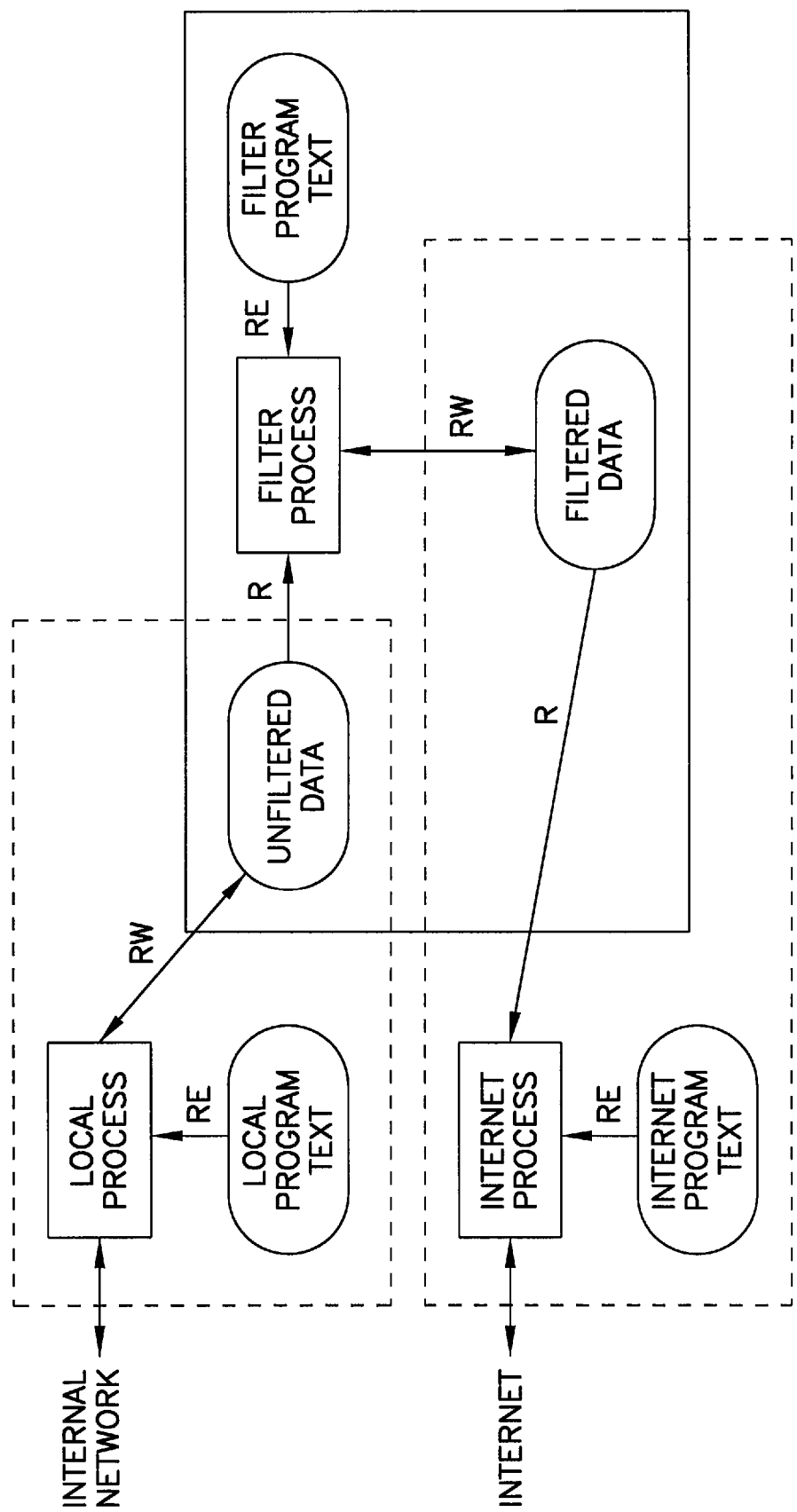

An example of an assured pipeline appears in the diagram shown in FIG. 5*a*. The flow of data between processes in FIG. 5*a* is controlled by the access enforcement mechanism of the Intel Pentium processor. Virtual memory translation circuitry within the Pentium processor includes a mechanism for assigning access privileges to pages of virtual memory. This ensures that control is imposed on every fetch from, or store to, the machine memory. In this way, the protection is made continuous. The Pentium access control mechanism enforces the following modes of access:
  Read Only (R): Data values may be fetched from memory and used as inputs to operations, but may not be modified or used as program text.
  Read Execute (RE): Data values may be fetched from memory and used as inputs to operations, and may also be used as program text, but may not be modified.
  Read Write (RW): Data values can be fetched from memory and used as inputs to operations, and may also be stored back in modified form.
  No Access: The data cannot be fetched from memory for any purpose, and it may not be modified.

The diagram in FIG. 5*a* then shows how these hardware-enforced accesses are used to force data flowing from internal network 82 to the Internet to go through a filter process, without any possibility that the filter is bypassed or that filtered data is tampered with by possibly vulnerable software on the Internet side of the filter.

The access a process has to a data object via Type Enforcement is defined by an entry in a central, protected data structure called the Domain Definition Table (DDT). A representative DDT is shown in FIG. 5*b*. A Domain name denotes an equivalence class of processes. Every process in execution has associated with it two Domain names which are used to control its interaction with object and with other Domains. The real Domain of a process is used to control Domain to Domain interactions and to grant or deny special, object-independent privileges. The effective Domain of a process is used to control its access to objects. The real and effective Domains of a process will generally be identical; the circumstances in which they differ are described below.

A Type name denotes an equivalence class of objects. Objects are, in general, the "base types" of BSD/386 Unix: files, directories, etc. There are eight default subtypes: file, directory, socket, fifo, device, port, executable, and gate. The implied default subtype pipe is, in effect, untyped because no check is made on access to pipes. The source code names of these subtypes are given in the table in FIG. 6.

Type names consist of two parts and, in the preferred embodiment, are written in documentation and comments as creator:subtype. The creator field is the four-character name of the Domain which created the object. The subtype field denotes the "class" of the object within that Domain. Subtype names are also four characters long and may contain any printable character except '*' or whitespace.

The TESLA convention is that subtypes will not be shared; thus Mail: file means, in effect, "the files private to the Mail Domain." When object are created they are automatically assigned the appropriate default subtype. Objects which are to be shared between Domains must have their subtype changed from the default to an explicit subtype.

Subtypes can be assigned one of three ways:
By having a default subtype assigned when the object is created by the operational kernel.
By having an explicit subtype assigned by the privileged chtype or fchtype syscalls. Thus a file which was to be shared between the Mail Domain and some other Domain would first be created as Mail:file and then changed to, e.g., Type Mail:Publ. If an subtype is changed to a default subtype, then the object becomes private.
By having a default or explicit subtype assigned administratively by the administrative kernel.

The default subtypes exec and gate are "static." The operational kernel will not create any objects of those subtypes, change those subtypes into any other subtype, or change any other subtypes into a gate or exec.

The Domain/Type relationship is used to define the modes and consequences of accesses by processes to objects. The modes and consequences of accesses are defined by access attributes which are store in the DDT database. The DDT database is "indexed" by three values:
The effective Domain of the process requesting the access or action.
The creator field of the object Type.
The subtype field of the object Type.

The result of "indexing" is the retrieval of a set of access attributes. The term "attribute" is used instead of "mode" because some of the attributes define immediate side effects. The selection of attributes was governed by the following considerations.
To constrain the modes of access which processes may exercise on objects.
To prevent the execution of any application software other than that which has been installed through the controlled administrative environment.
To enable the spoofing of attackers so that the attack response facilities can be used to trace them at the physical packet level. This required a more sophisticated response to illegal accesses than just shutting down the offending process.

The possible access attributes and their meanings are given in the table in FIG. 7.

Interactions Between Domains and Domains

The rules which govern the setting of the real and effective Domains of a process are as follows:
Processes which are created by a fork syscall have their real and effective Domains set to the real and effective Domains of the parent process.
If the executable used by execve syscall is of subtype exec, the real and effective Domains of the process are unchanged.
The makedomain syscall may be used to change the real Domain of a process at the same time the executable is changed (analogous to execve). The new real Domain must be allowed by the DIT (the process is as shown in FIG. 11), and the effective Domain is changed to the new real Domain.
the changedomain syscall may be used to change the real Domain of a process without changing the executable.
if the executable used by execve is of subtype gate, the effective Domain of the process is set to the creator field of the full Type name of the executable. This action is called implicit gating. The new effective Domain must be allowed by the DIT.
The gate syscall may be used to change the effective Domain of a process without changing the executable. The new effective Domain must be allowed by the DIT. This action is called explicit gating.
The ungate syscall may be used to change the effective Domain of a process back to its real Domain. This action is called ungating.

Consider the case where a process running in the Mail Domain has execute access to files of Type Mail:exec and SMTP:gate. Further assume that there exists a Domain MIME. Then the new and effective Domains resulting from the relevant syscalls are shown in the table in FIG. 8. Gating facilities are not absolutely necessary for Type Enforcement to work. They exist for the following reasons:
To simplify the DDT, by reducing the number of Types that would have to exist simply to implement inter-Domain data flow.
To improve performance, by reducing the amount of copying and signalling required to coordinate activities in different Domains.
To facilitate the porting of existing code whose process structure was not determined or influenced by considerations of least privilege or confinement of effect.

Gating permits a process to temporarily become a member of another Domain. The "home" or permanent Domain of the process is called its real Domain and the temporary or assumed Domain is called the effective Domain.

Implicit gating is used when it is necessary to strictly control the manner in which the effective Domain's accesses are used. Implicit gating "ties" the temporary Domain change to a specific executable which has been subjected to extra scrutiny to insure that the effective Domain's accesses are used safely. The "tying" of the Domain change is done because the Domain change is a side effect of execve'ing a special executable: one whose subtype is gate. Implicit gating also allows Domain changes to be defined by changing the Type of an executable instead of inserting explicit calls into the source code.

Explicit gating is used when a looser control on the temporary Domain transition is appropriate, or when the "tying" of the gating to a specific executable would require excessive restructuring of existing software.

Domain changes are controlled by the DIT. The logical structure of the DIT is a table with an entry for each Domain. The logical structure of each entry is that of two pointers, one to a list of allowed real Domains and the other to a list of allowed effective Domains. Thus, if a process executed a makedomain or changedomain, the real Domain of the process selects the entry and the Domain given by the domainname argument must be on the list of allowed real Domains for the Domain change to happen. Likewise, if a process executes a gate, the Domain given in the domainname argument must be on the list of allowed effective Domains. Finally, if a process executes an execve of an executable whose subtype is gate, the creator Domain of that executable must appear on the list of allowed effective Domains.

Certain kernel syscalls are restricted to processes executing out of privileged Domains. In the preferred embodiment of Type Enforcement two levels of checks are made. First, the normal BSD UNIX permissions are checked; if these permissions cause the operation to fail, the system call returns the normal error code. If the UNIX permissions are adequate, the TE privileges are checked next, (and thus in addition to the UNIX permissions).

The following BSD system calls have been modified to properly implement Type Enforcement. The modified calls have been grouped into four groups for ease of explanation.

The first group of system calls that require modification are those that set or affect the identity and/or state of the computer. Two of these system calls affect the computer's internal time: settimeofday and adjtime. Both of these system calls have been modified to require the <can_set_clock> privilege before the request will be honored. In the event of a privilege violation, the system call will raise an Alarm, will not honor the request, but will return success.

Other system calls which affect the computer's notion of self identity are sethostname and sethostid. Both of these system calls have been modified to require the <is-startup> privilege before the request will be honored. In the event of a privilege violation, the system call will raise an Alarm, will not honor the request, and will return the EPERM error flag. The last system call affects the computers runtime status, reboot. The reboot system call has been modified to require the <admin-reboot> privilege before the request will be honored. If the request is honored, the computer will boot to the admin kernel (single-user mode only with networking disabled). In the event of a privilege violation, the system call will raise an Alarm, will not honor the request, and will return the EPERM error flag.

The second group of system calls that require modification are those that allow interaction with the computer's filesystem. The open system call has been modified to become the primary TE check. After performing the normal BSD UNIX permission checks, the TE check is performed. An Alarm is raised if the TE check returns null (no permissions), or if the caller asks for read but the <ddt_read> privilege is not set, or if the caller asks for write but the <ddt_write> privilege is not set. The creat system call has been modified to set the new file's Type to <creator:file>. Additionally, the creation of a new file implies a write operation on the directory, which in turn implies that the TE-modified open system call will be used to open the directory file, which in turn implies that TE can be used to control the success or failure of the creat system call. The unlink and rename system calls are modified in like manner. The unlink system call requires the <ddt_destroy> privilege. The rename system call requires the <ddt_rename> privilege on the "from" file, and if the "to" file exists, it further requires the <ddt_destroy> privilege on the "to" file. In the event of a privilege violation, both the unlink and rename system calls will raise an Alarm, will not honor the request, but will return success. The access system call is modified to require the <mode> privilege on the file pointed to by the path. In the event of a privilege violation, the access system call will raise an Alarm, will not honor the request, but will return success. The chflags, fchflags and quotacl system calls are modified in alike manners. All are modified to perform no functions. Attempts to call them will raise an Alarm, will not honor the request, and will return EPERM. The mknod system call is modified to perform no function. Attempts to call it will raise an Alarm, will not honor the request, and will return EPERM.

The third group of system calls that require modification are those concerning process creation, maintenance and tracing. The fork system call has been modified so that the child process inherits both the real and effective Domains of the parent process. The execve system call is modified to require the <ddt_exec> privilege on the file pointed to by the path before the request will be honored. The real and effective Domain of the process remain unchanged. In the event of a privilege violation, the system call will raise an Alarm, will not honor the request, but will return success. The ktrace, ptrace and profil system calls are modified in alike manners. All are modified to perform no function. Attempts to call them will raise an Alarm, will not honor the request. The ktrace and ptrace system calls will return EPERM, whereas the profil system call will return EFAULT.

The mprotect system call is modified to perform no function. Attempts to call it will raise an Alarm, will not honor the request, and will return EPERM.

The fourth group of system calls that require modification are those that relate processes to user ids. The setuid and seteuid and old.setreuid system calls are modified in alike manners. All are modified to require the <suppress_su_alarm> privilege before the request will be honored. In the event of a privilege violation, the system call will raise an Alarm, will not honor the request, and will return success. The acct system call is modified to perform no function. Attempts to call it will raise an Alarm, will not honor the request, and will return EPERM. The setlogin system call is modified to require the <can_setlogin> privilege. In the event of a privilege violation, the access system call will raise an Alarm, will not honor the request, but will return success.

A final set of system calls consists of those that are removed entirely from the BSD UNIX kernel. This set of system calls includes: obs_vtrace, nfssvc, asynch_daemon, getfh, shmsys, sfork, getdescriptor, and setdescriptor. (The set of system calls that were added to the BSD UNIX kernel is discussed elsewhere.)

Figure 10:
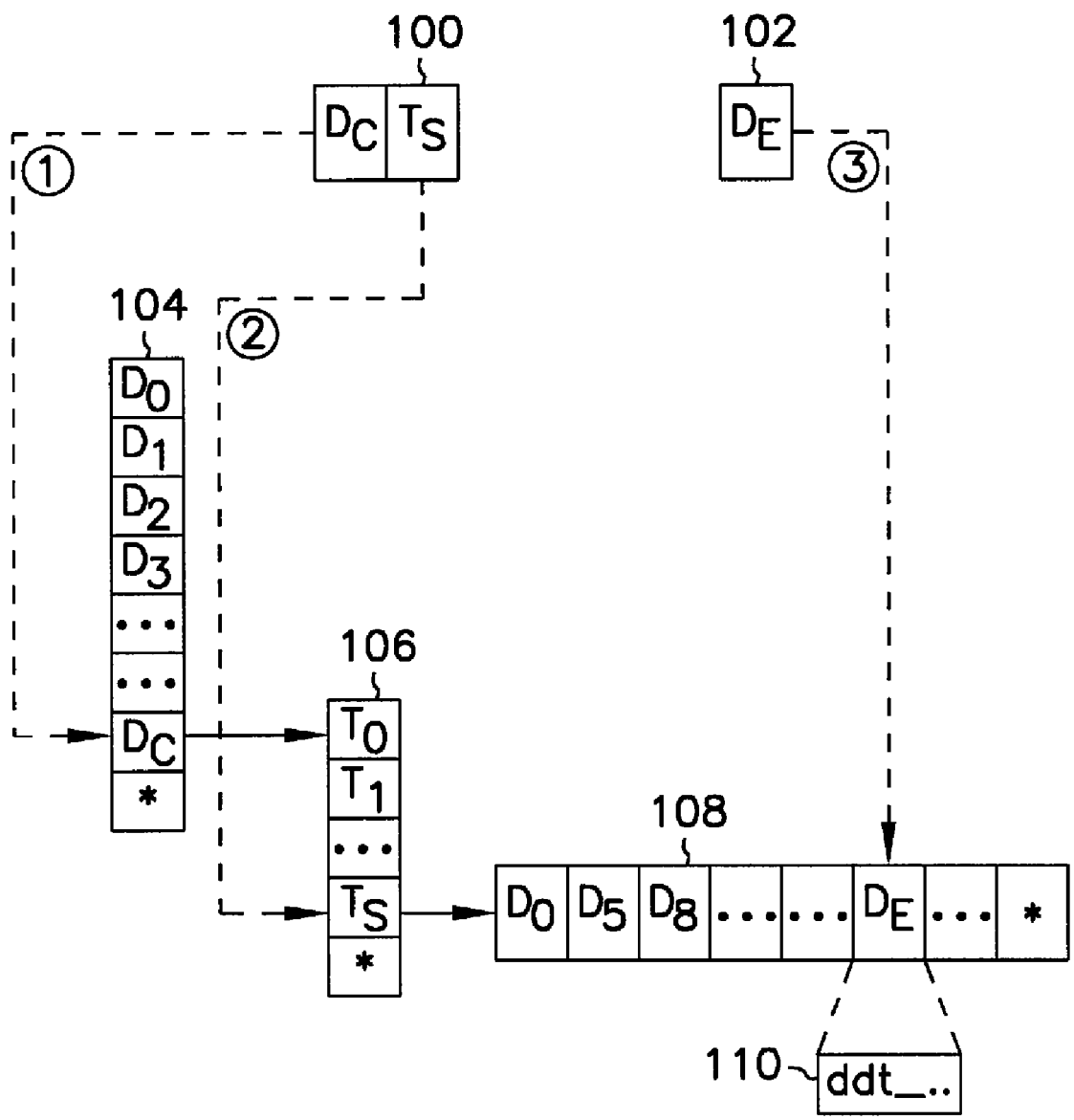
FIG. 10 is a representation of steps taken in determining access privileges from the DDT.

The manner of searching the DDT is given in the diagram in FIG. 10. The algorithm is as follows:

Obtain Type name 100 from the inode, where it is stored as a long, and parse it into two parts: the creator Domain $D_C$ and the subtype name $T_S$.

Obtain effective Domain 102, $D_E$, from the process data base. If the executable object attempting the access is of Type $D_G$:gate, change $D_E$ to $D_G$. (Note that a previous search of the DDT must have returned ddt_exec on the exec or gate object for this process to have begun.)

If $D_E=D_C$, and $T_S$ is one of the default subtypes such as file (but not one of the "static" subtypes gate or exec) then return ddt_read+ddt_write +ddt_rename access.

If $D_E \neq D_C$, or if $D_E=D_C$ and $T_S$ is not one of the default subtypes, then search the DDT structure 104 for the entry corresponding to $D_C$. If no such entry exists, search the structure for a "wildcard" entry. If neither an entry corresponding to DC, or a "wildcard entry" exists in the structure, assign null access.

If an entry for $D_C$ exists, search the subtype list 106 it points to for an entry corresponding to $T_S$. If no such entry exists, search the subtype list it points to for a "wildcard subtype." If neither such entry exists, assign null access. If an entry for $D_C$ does not exist, but a "wildcard" entry does, search the subtype list the "wildcard entry" points to for an entry corresponding to $T_S$. If no such entry exists, search the subtype list the "wildcard entry" points to for a "wildcard subtype." If neither an entry corresponding to $T_S$, nor a "wildcard subtype" exists in the subtype list, assign null access.

If a subtype list entry for $T_S$ exists, search the Domain vector 108 it points to for an entry 110 corresponding to $D_E$. If no such entry exists, search the Domain vector for a "wildcard Domain." If neither an entry corresponding to DE, nor a "wildcard Domain" exists in the Domain vector, assign null access.

If a Domain vector entry for $D_E$ exists, return the access values it contains. If a "wildcard Domain" entry exists in the Domain vector, return the access values it contains. If neither a Domain vector entry for $D_E$, nor a "wildcard Domain" exists in the Domain vector, return null access.

The above algorithm describes the "logical" process of searching the DDT; the actual implementation is described next.

As noted above, in one embodiment, Domains and subtypes are stored as four printable character constants (white space doesn't count as printable—also, '*' is excluded). Due to constraints imposed by the fact that BSDI Release 1.1 does not contain complete source code, only the first character of a Domain and the first three characters of a subtype are significant, and thus must be unique. Furthermore, there is a convention that subtype names that appear globally (i.e., both default subtypes and subtypes used by more than one Domain) be made of lowercase characters, while private subtypes be made of uppercase characters.

These four character names are represented by C constants. For Domains, these constants begin with a D, while for subtypes, these constants begin with a T. The following character should also be in uppercase (e.g., DRoot, TFile). There is also two special constants: kWildcard=****, which matches any subtype or Domain, and kEOL=0, which is used to mark the end of a list. These constants are all defined inside a list of enum's since using #define would result in too many compiler warnings (the C compiler warns about multi-character constants, by using enum's, it will only warn once for a given constant).

There are six default subtypes, based on existing Unix types:

```
/* Here are the default types... */
TFile = 'file'
TDirectory = 'diry',
TSocket = 'sock',
TFifo = 'fifo',
TDevice = 'devi',
TPort = 'port',
TExec = 'exec',
TGate = 'gate'
};
```

TExec is a special subtype, which can only be assigned by the isolated administrative kernel. It represents executables which any Domain can execute if execute access is allowed by the DDT. TGate is a special sort of TExec—what it does is change the effective Domain in which a process is executing to the creator Domain of the gate. It only does this if the starting Domain has execute access to the file of subtype gate. After "gating," a process now acts like it is in the creator Domain for the purposes of the DDT checks only—any checks against the DIT are made with the real Domain, rather than the effective Domain. Needless to say, a gate is a powerful and potentially dangerous thing—just like the setuid bits which gating is designed to replace. Note that there is a special check in the normal DIT checks—if we are attempting to change to the real Domain, we don't bother to check the DIT of the effective Domain (like we otherwise normally would). This maneuver is "ungating"—explicitly leaving the gated Domain and returning to the original Domain.

There is only one pre-defined Domain:

```
enum {
    DRoot = '$SYS', /* Root is actually a special alias for
        the zero domain that the system is started
        in */
};
``` which is used to represent system level defaults—whenever a Domain that hasn't been explicitly set (for either a file or a process), DRoot is used for the Domain value in permission checks.

The DDT is made of a three level table, indexed by the file's creator Domain, file's subtype and then finally by the executing Domain. This yields a set of access permissions:

typedef unsigned long ddt_permissions;

```
enum {
    ddt_read = 1,
    ddt_write = 2,
    ddt_rename = 4,
    ddt_exec = 8,
    ddt_trigger = 0x10,
    ddt_chcreator = 0x20,
    ddt_destroy = 0x40,
};
```

These permissions work mostly as expected—ddt_read, ddt_write are for read and write; ddt_rename permits changing the name of the file; ddt_exec is used to grant execute permission; ddt_destroy is required to delete a file. ddt_chcreator is much like create permission, but since files are created with a default subtype, this permission allows the given Domain to change the subtype and creator of the file to the corresponding subtype/creator pair. ddt_trigger isn't really a permission—rather, any checks to this specific file will automatically trigger an alarm, regardless of what permission is asked for or granted. This allows, for example, a "reverse trojan" file that would never be executed except by an attacker, in which case an alarm would be triggered and packet-level auditing performed.

The indexing begins with an array "indexed" by Domain:

```
typedef struct {
type_name src_domain; /* What domain this entry is for */
    unsigned long domain_flags; /* The "global" permission flags */
type_name * the _dit; /* What domains we can enter into */
    ddt_type_list the ddt; /* The permissions for our types */
} permission_table;
```

This array should have an entry for every Domain. For the DDT, this table is searched until the src_domain matches the creator Domain of the file. Assuming that it is found, we then look at the _ddt an array "indexed" by subtype:

```
/* This is the permission for a specific domain, listing all its types */
typedef struct {
    type_name the _type; /* The subtype */
    ddt_domain_vector_entry * the_vector;/* A list of what can be done to it */
} ddt_type_list_entry, *ddt_type_list;
```

We just look through this list until we either find the subtype, a wildcard, or the end of the list (in which case we return no permission). We then need to look at the appropriate the_vector—an array "indexed" by Domain:

```
typedef struct {
    type_name the _domain; /* The using domain */
    ddt_permissions the permission; /* What it can do */
} ddt_domain_vector_entry, *ddt_domain_vector;
```

This is search for the executing Domain, and if found, we return the_permission, which contains the flags for that access.

Searching the DIT starts like searching the DDT. We look through the global table for the starting Domain, and find the appropriate list of Domains the_ddt. This is simply a list of Domains, terminated with kEOL. We search through that list, and if we find the desired destination Domain, we can make the transition to it.

Every Domain also has a list of privileges that it can perform:

```
enum {
    can_ch_type = 0x00010000, /* We can call ch_type, changing type */
    supress_su_alarm = 0x00020000, /* Allow process to think it is su */
    admin_reboot = 0x00040000, /* Allow reboot */
    can_set_clock = 0x00080000 /* Can set the clock */
    can_setlogin = 0x00100000 /* Can perform setlogin */
    is_startup = 0x00200000 /* can perform startup actions */
```

We look through the permission table to find the appropriate Domain, and then get these permissions from the appropriate domain_flags field. Note that there is no explicit "can_ch_domain" permission; restrictions on Domain transitions are enforced by the DIT.

Since each and every array must be a separate C structure, every array needs to have a unique and meaningful name to connect one array to its parent. This is best explained in a "simple" example.

```
/* NB: In the initial implementation, domains need to have unique
    first characters */
enum {
    DRoot = '$SYS', /* Root is actually a special alias for the zero
                       domain that the system is started in */
    DUpdate = 'sync',
    DSwap = 'Swap'
    DUserSession = 'User',
    DSyslogd = 'Logd',
    DCron = 'Cron',
    DRouted = 'Rout',
    DSendmail = 'mail',
    DIntd = 'inet',
    DTelnet = 'inet',
    DShell = 'rshd',
    DRExec = 'exec',
    DFinger = 'fing',
    DNetwork = 'xnet',
    DLpd = 'lpd.',
    DPortmap = 'port',
    DFsck = "Fsck',
    DQuota = 'quot',
    DXDos = 'dosx',
    DFtp = 'Tran',
    DInnd = 'News'
};
```

These are just a list of sample Domains:

```
type_name Root_dit[ ] = {
DUserSession, DSyslogd, DUpdate, DCron, DRouted, DLpd, DPortmap,
DSendmail, DInetd, DInnd, kEOL
```

These are some addition private subtypes for our example:

```
/* Here are some other types */
enum {
    TStartup = 'Stup',
    TConfig = 'Conf',
    TCronJobs = 'CJob'
```

This is the list of Domains that the root Domain can change to. The naming convention here is DomainName_dit, where DomainName is the name of the constant for that Domain without the leading "D". The Domain list is terminated with a kEOL.

```
{ ddt_domain_vector_entry Root_Startup[ ] = {
    { kWildcard, ddt_read},
    { kEOL } };
```

This is our first Domain vector. The naming convention is CreatorDomainName_TypeName, where CreatorDomainName is the name of the constant for the creating Domain (without the leading "D"), and TypeName is the name of the constant of the subtype. Vector is initialized to contain a list of Domains and permission paris, terminated with {kEOL}.

```
ddt_domain_vector_entry Root_default [ ] = {
    /* This is the default permissions for all procs on all unassigned files */
    { kWildcard, ddt_read|ddt_write|ddt_rename },
    { kEOL }
};
```

Root_default will be the Domain vector for creator Root, and subtype KWildcard—basically the default for any subtypes created by DRoot who otherwise wouldn't have a special Domain vector.

```
ddt_domain_vector_entry Root_Exec[ ] = { /* Default for executables */
    { kWildcard, ddt_exec|ddt_read },
    { kEOL }
};
```

Another Domain vector, this time for all executables owned by the system.

```
ddt_type_list_entry Root_types [ ] = {
    { TStartup, Root_Startup },
    { TConfig, Root_Startup },
    { TExec, Root_Exec },
    { kWildcard, Root_dDefault },
    { kEOL }
};
```

Once we have all the Domain vectors for a given creating Domain, we can make the corresponding subtype list. The naming convention is CreatingDomain_types. It is composed of pairs of subtypes and the corresponding (previously declared) Domain vectors. Note that it is possible for more than one subtype to use the same Domain vector (in this case, both TStartup and TConfig).

```
permission_table Rover [ ] = {
    { DRoot,
            can_ch_type | can_ch_creator | admin_reboot |
            can_set_clock,
            Root_dit, Root_Types },
    {DInetd,
        0,
        Inetd_dit, NULL }
,   { kEOL }
};
```

Here is the master permission table "Rover". It is composed of a list of Domains (two in this case). Each entry contains the Domain name, the permissions for that Domain, its DIT and its subtype list. If the DIT is NULL, then no Domain transitions out of that Domain are allowed. If its subtype list is NIL, then there is null access to all subtypes of that creating Domain. The last entry, of course is the kEOL termination.

Every process runs in a Domain, which is stored in the kernel proc data structure. This property is copied to processes that are forked, and is unchanged by executing most binaries and shell scripts. The Domain can be explicitly changed via the makedomain system call, which, if permitted, changes Domain for that process from that point forward. Privileges of a given Domain can also be granted to something running in another Domain via a "gating" process—a process that executes a file of subtype gate will, assuming there is execute permission granted to the current Domain for that file, temporarily assumes the privileges of the creator of the gate file. This is accomplished by an "effective Domain:" field in the kernel proc data structure. This field is also copied during forking, and is reset when makedomain is successfully called (reset to the new Domain specified). Most importantly, the effective Domain field is used to check file access permissions, but real Domain is used for checks from makedomain. There is, however, a special addition to makedomain for the purpose of "ungating"—if the process is calling makedomain with the real Domain, it automatically succeeds (thus resetting the effective Domain to the real Domain), allowing a process to return to the Domain that it started in. The Domain transition permissions are all handled in domain_to_domain. This routine first looks up the source Domain in the permissions table. It will use the kWildcard entry, if any, to provide default source Domain permissions. It then looks in the DIT vector for the destination Domain, and, if found, allows the transition. It will not, however, use a wildcard in that vector, since this would allow a given Domain to transition to every other Domain.

The most important check that execve makes is to check for ddt_exec access. It looks at the subtype and creator of that which is to be executed and the effective Domain of the current process (not the real Domain), and makes sure that there is ddt_exec access. If there is it also compares the subtype of the file to see if it is gate—if so, we change the effective Domain to the creator of that file.

There is also logic in execve that makes sure that we don't gate by mistake—the old effective Domain is grabbed at the start of execve, and any time that an error is returned, we first restore the old effective Domain.

chtype/fchtype are used to change the subtype and/or creator of a file. Because of this power, they must be carefully controlled. One of the first constrains on chtype is that it can either change both the subtype or creator. We can never change anything about a file that we aren't currently the creator of. Furthermore, since exec and gate are special static subtypes, we can never make or unmake an exec or gate. This is only done from the administrative kernel. The final special rule is that we can only change to a subtype/creator that already exists (this is to prevent making "orphaned" object, but with the special kWildcard type we could still specify access permissions for these things, so this rule could be removed). Note that this "check for existence" will accept wildcards in the permission table as matching whatever we pass in.

The other checks made by chtype/fchtype are checks to the permission table. First off, the executing Domain needs to have can_ch_type permission. Then, if we are only changing the subtype of an object that we created (and all the checks in the previous paragraph pass), then we just go ahead and do that. If however, we are changing the creator as well, we check the ddt to see if our effective Domain (as opposed to real Domain—see gates for more detail) has chcreator capabilities for the creator/subtype that we are going to change the file to (we already know that we created it, so we don't care what the subtype is). If we do then we change it, if not, then we don't.

Actually changing the subtype, since we are hacking subtype and creator into the flags field of the vnode, requires us to be running as root (since we are changing both words of the flags field, and VOP_SETATTR seems to care). So, before calling VOP_SETATTR, we first save the cr_uid, set it to zero, and then restore it. When we modify VOP_SEATTR to write our subtype and creator to the real places in the inode, this will be removed.

check_ddt takes an effective Domain and a creator:subtype pair and looks for specific access attributes, returning those that correspond to permissions, and raising alarms if things don't work as expected. The first thing that check_ddt does, after mapping any potentially undefined fields to DRoot and/or TFile (if the subtype or creator is zero, such as on a file system not properly set up), is check for the default subtypes. If the source Domain is the same as the creator, and the subtype is one of the default eight subtypes, the returned access attributes are ddt_read+ddt_write+ddt_rename.

Otherwise, we need to look up the creator:subtype in our tables. If we find them (or appropriate wildcard matches), we then search the Domain vector to find the source Domain. If we find that (or again, the wildcard), the return permission is taken from there. If we never find one of the respective entries, the return permission is no permission.

The last step in check_ddt is to see if the return attribute is inconsistent with the permissions asked for by the caller, or if the resulting permission includes the ddt_trigger attribute. If either of these cases are true, then we need to log this request to the alarm mechanism. This involves writing out the process id, the name of the file, the parameters and what permission is returned. The alarm processing would, at that point, take appropriate action.

In addition, the system 40 shown in FIG. 4 is constructed so that no software may be loaded into it except under the control of the System Administrator, and even then only when the system is disconnected from all networks. (This is a function of the two kernels: operational and administrative, as described above.) The Type Enforcement mechanism allows a strict least privilege design to be defined and enforced. Least privilege is a way of achieving confinement, or the limiting of a software module's effects. A least privilege design is one in which software only touches the data it needs to operate and only touches it in ways that the designer intended. Unwanted side effects, whether from bugs or malicious trojan horses, are then limited to the module's "immediate vicinity." This fundamental ability of Type Enforcement, when properly applied, stops dead the most common types of attacks, where a vulnerability in one application is used to interfere with, or take control of, more critical sections of the system.

In order to take advantage of this capability, the application only needs to follow traditional Unix practices and be implemented as several processes. These processes can be assigned to a distinct class, as can the data that they access. The DDT can be configured to allow only the least amount of access necessary for the desired functionality.

The Type Enforcement described above permits a security architect to construct a set of interconnected applications and protect them with countermeasures such as data filters. The architect can do this with the confidence that the applications and countermeasures will be isolated from each other and share data only in the ways the architect defines. This enables the architect to upgrade system 40 quickly to respond to changes in threat, by adopting new countermeasures; to secure new applications, by constructing countermeasures that address the specific vulnerabilities of the application; and to implement customer-specific security policies which balance risk against operational effectiveness.

Since Type Enforcement defines pipelines and subsystems which are independent with regard to privilege, the addition of a new subsystem or the extension of a pipeline does not, in and of itself, obsolete the assurance evidence produced for the previous structure. Rather, the assurance team can examine the new interactions and decide precisely which conclusions about isolation are still valid and which have to be re-examined.

Type Enforcement has also demonstrated its ability to support cryptography, whether implemented in hardware and software. Cryptographic processing, with its requirements for separation of plaintext and ciphertext, is inherently a pipelined process. This is true whether the cryptography is placed in its traditional "inline" position or whether it is used in the "coprocessor" mode required for the more advanced services such as digital signatures and non-repudiation.

Type Enforcement is better than the basic Unix protection mechanisms for two reasons: it is centralized instead of decentralized, and it does not permit any process to have global, uncontrolled access. In Unix, individual programs use the setuid mechanism to set their own privilege level. A particular privilege level, called "root," or "super-user," lets a user do anything they want to the system: observe and manipulate data, disable auditing, install trojan horses, or masquerade as other users. This combination of decentralization and potential global privilege is deadly. Decentralization means that there is no one place you can look to see if the system is configured securely. Global privilege means that a single vulnerability or configuration mistake can be catastrophic.

Type Enforcement eliminates both these problems. If you stop a system 40 as described in FIG. 4 and dump the DDT you can tell for sure which code could ever have touched which data. You can never tell that in a Unix system. And nobody ever gets global privilege when secure computer 80 is attached to a network.

In the preferred embodiment, the Type Enforcement restrictions supplement, but do not replace, the standard Unix permissions. That is, you can set Unix permissions to give less, but not more, access than Type Enforcement allows. And super-user privilege is still there, but it cannot be used to exceed the Type Enforcement limitations.

In one embodiment, a system 40 detects an attack in progress (as a result, for instance, of a Type Enforcement violation) it trips a "silent alarm" which is responded to by application-specific countermeasure software. This software can, depending on the nature of the attack, do the following things:

Capture the IP address of the attacking site, enabling calls to site administrators to trap attackers in the act.

Feed the attacker false and misleading data.

Feed the attacker useless but "interesting" data so he stays on-line and can be traced.

Feed the attacker data containing covert identification data that can be used to prove that data was stolen from this site.

In one embodiment, a binary filter is used to ensure that neither executables nor encrypted files are transferred into or out of system 40. (The prohibition against executables is an attempt to capture malicious software transferred into the system and to detect the posting of potentially proprietary object code from system 40 onto the Internet. The prohibition against transfer of encrypted files is an attempt to prevent the posting of encrypted versions of proprietary information either to or from system 40.) In one binary filter embodiment, text is analyzed to determine if it is written in English. The filter looks each character and its next neighbor and determines the frequencies of pairs of letters ("a diagraphic index of correlation"). If the index of correlation approximates what would be expected for English text, the file is probably English text and can be transferred. If not, filter 92 stops the transfer.

Operation of the Secure Wide-Area Access System

When a Client desires to put information out on Public Network 74, he or she must first use the Local Cryptography to establish and authenticated and protected interaction with Secure Computer 48. The Client then issues the requisite commands through the Client interface, and these commands and their associated are then executed and controlled by the integrated set of services and filter counter-measures on the Secure Computer. The Public Network Protocol and Cryptography module then selects the appropriate authentication and protection mechanism for the interaction on Public Network 74. Depending on the protocols and cryptography used, Public Network 74 and Cryptography module 70 may then perform cryptographic and format transformations on the data. Most commonly, these would involve decrypting data that was encrypted using Local Cryptography, changing its format from a local messaging or data transfer format to a global standard, and encrypting using Global Cryptography. At the same time, Secure Computer 48 can generate an audit record and protect it with cryptographic keying material accessible only to authorized administrators.

If authentication is required, Secure Computer 48 can either "endorse" or "notarize" the data using cryptographic keying material of its own, or it can act as a secure storage and selection facility whereby the local authentication of the Client is used to select the personal keying material used to authenticate the Client's identity on Public Network 74. Secure Computer 48's facilities can use other information, such as time of day, content of the data, etc., as well as the facilities of the Local Cryptography to decide whether or not to perform authentication of the outbound information.

Figure 12:
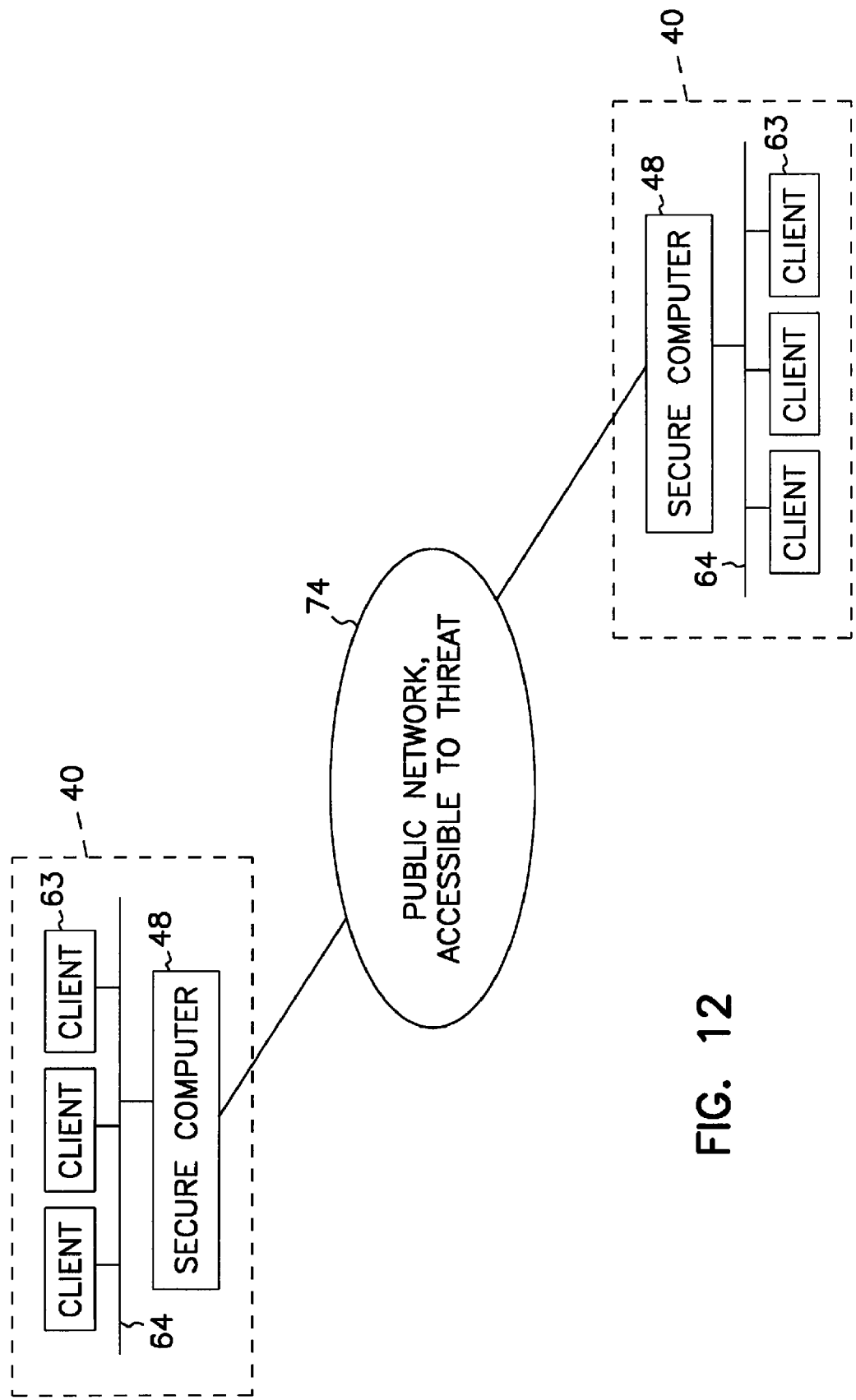
FIG. 12 is a system level block diagram of a wide area network connecting two organizational enclaves according to the present invention.
Figure 13:
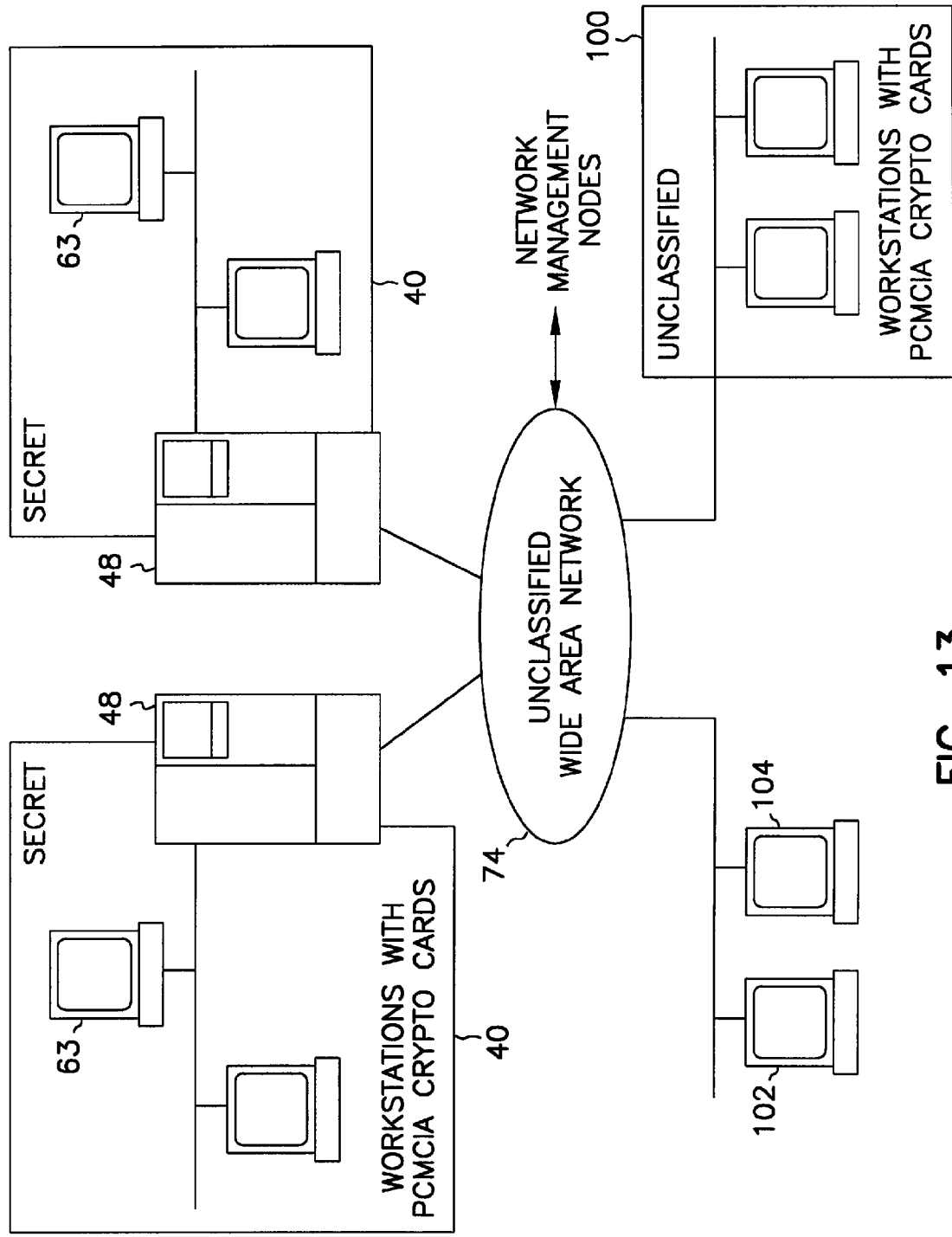
FIG. 13 is a system level block diagram of another embodiment of a wide area network connecting two organizational enclaves according to the present invention.

An important special case is where two systems 40 at two different sites belong to the same organization. Such a situation is shown in FIGS. 12 and 13. In FIG. 12, two systems 40 are connected by an external Public Network 74. In FIG. 13, two systems 40 connected by an external Public Network 74 can also communicate with an unclassified workgroup 100 or with individual computers 102 and 104 connected directly to Network 74. In such cases, special protocols and keying material can be used to identify the systems to each other and indicate special actions, such as administrative changes and alarms. In addition, systems 40 can easily distribute keys between themselves in a secure manner. In one embodiment, systems 40 include Trusted Path software which can be used to establish a trusted path between independent systems 40 over Public Network 74.

Inbound information flow is essentially symmetric to outbound: the data is received from Public Network 74, if necessary decrypted and has its authentication checked, and then is passed through the Filter Countermeasures 68 to determine whether the organizational security policy allows data of that label, format, or content to be released into Private Network 64. If it does, Secure Computer 48 uses Local Cryptography to protect and authenticate the transmission to Client Workstation 63. When the Client accesses the data, he or she can use that cryptography to verify that the data is what it was authenticated to be over the Public Network 74.

Advantages Over Other Methods of Securing Data Transfer

The general advantages of the invention derive from its centralization of security services in Secure Computer 48. This centralization takes advantage of the fact that Client workstations 63 must be supported by centralized services such as directories for electronic mail, databases of security attributes, and archival storage of cryptographic keys. Thus every Security Architecture which makes use of cryptography is, to one degree or another, centralized.

Similarly, the facilities for detecting and responding to security alarms are most usefully centralized. Notifying a Client in a possibly exposed location that a network is possibly under attack can be counterproductive: the Client may not be authorized for such information, and even if authorized the individual may not have a secure means of communicating this information to administrators. Also, one does not want to notify a possible insider threat that an attack has been detected. Thus again a degree of centralization in the architecture is unavoidable. Further centralization of security mechanisms adds both security and economic benefits:

1) Mechanisms at the workstations can be implemented as software and minimal, if any hardware. This implementation strategy limits the strength of the workstation mechanisms, and is only acceptable when they are "backed up" by the strength and facilities of a central Secure Computer and the restricted access inherent in a Private Network.

2) Concentration of the security requirements and facilities in the Secure Computer enables that unit to undergo scrutiny to a degree that would not be feasible for individual workstations. If the Secure Computer is properly engineered it should be able to support multiple generations of workstation technology, thereby spreading the cost of specialized security engineering over time.

3) Concentration of countermeasures in a specially-engineered Secure Computer raises the effort and risk of technical attacks because it forces the attacker to either reverse engineer and implement, or obtain through other means an up-to-date copy of the Computer and all its associated countermeasures software. This is harder than obtaining an instance of a workstation and its associated software. Concentration also simplifies the process of responding to new or unanticipated attacks, as there are fewer units to change and those units are already under the control of security administrators.

4) Concentration also simplifies the process of administering the security databases and increases the speed and reliability with which privileges can be granted and, more importantly, revoked.

5) The Secure Computer will, by its very nature, have the features which make it a near-optimum platform for key management and distribution: strong authentication of individuals, secure storage of data, controls on access to that data, and strong resistance to attacks by malicious software.

6) The Secure Computer, by virtue of its central role and close interaction with security administrators, provides a logical and effective location for the receipt and response to security alarms. This characteristic combines with the ability to respond to new attacks by upgrading a smaller number of central sites and the speed and effectiveness of changes to security data bases to make the centralized approach inherently more responsive than architectures without a central point of security enforcement, where alarms, changes to software, and changes to data bases must propagate over a larger number of user-administered workstations.

In particular, the invention provides superior client authentication over methods such as Workstation Cryptography. In Workstation Cryptography, Clients authenticate themselves at vulnerable workstations by means of personal identifiers such as passwords, passphrases, Personal Identification Numbers, or token-based authenticators. There is no protected backup or contextual check possible on such authentication actions; once authenticated, the Client is granted, in effect, full access to the Public Network. By contrast, the Secure Computer can keep a protected record of Client actions, and assess the propriety of an authenticated action based on that data as well as other criteria such as time of day, whether it is a business day or a holiday, or other checks of arbitrary sophistication. Conversely, the invention permits the sending of "official" data or transactions in which the identity of the initiating individual is shielded from the Public Network and only the organizational identity is authenticated. This facility is useful when the nature of the transaction or data could make the Client open to unwanted attention, harassment, or retaliation.

The invention provides an advantage over Workstation Cryptography in that it is possible to enforce sophisticated, content-based organizational security policies. Such enforcement is not possible when data is enciphered at the workstation and then sent directly to the Public Network. In addition to enforcing content-based policies, the invention permits auditing of data contents to deter abuse of the privilege of sending data to the Public Network. Both of these facilities are useful in countering insider threats.

The invention is superior to Workstation Cryptography in that it can handle a multitude of communications protocols and cryptographic methods without making that diversity visible at the Client workstation. This not only reduces the amount of hardware and software mechanism at the multiple workstations, but it permits a single Client Interface to be used to access a heterogeneous Public Network. The Secure Computer, after it has decrypted data that was protected and authenticated by the Local Cryptography, can consult internal tables, directories on the Public Network, or the destination node to determine or negotiate a common protocol and cryptographic method. All of this can be done without Client knowledge or intervention.

The invention is superior to Workstation Cryptography in that it provides a safer and more reliable framework for the management of keying material. This advantage obtains irrespective of whether secret-key or public-key cryptography is applied. The Secure Computer provides a central site for the distribution and administration of keying material for all the Clients on the Private Network, and relieves the Client workstations of the responsibility of obtaining Public Network keying material for every interaction with that network. The distribution of Public Network keying material through the Secure Computer permits greater security in that the identities of the requesting Clients can be hidden from the Public Network keying material service. The invention also provides superior solutions to the problems of revocation, emergency rekey, and travelling user.

The use of the Secure Computer as the central point for the distribution and administration of keying material permits the effective and efficient revocation of access to either the Private or the Public Networks. In the most common configuration, secret-key methods will be used by Local Cryptography and public-key methods will be required for Global Cryptography. If the private key of a Client's public-key material are distributed to Client workstations, or, worse, stored on removable tokens that the Client can remove, then revocation of the ability to decrypt (or, more importantly, authenticate) data requires a time-consuming and unreliable "broadcast" of revocation requests to all possible destinations on the Public Network. If the private key is kept on the Secure Computer, then access to it can be revoked simply and quickly.

The invention is superior to Workstation Cryptography in providing emergency rekey service, especially when public-key methods are used on the Public Network. If the private key part of a Client's public-key material is lost or destroyed, the Client loses the ability to decrypt data which was previously encrypted with the corresponding public key. It is not sufficient to issue a new private/public pair, because there may be data in transit or in archives that was enciphered with the public key that corresponds to the lost private key. The problem then is one of saving a copy of the private key in a highly protected fashion, and making it available only after proper authorization has been obtained. This is a natural task for a Secure Computer with protected storage and mechanisms and access limited to authorized administrators. If the organization has Secure Internetwork Services Systems at multiple sites, then they can cooperate by maintaining backup copies of critical keying material for each other.

The invention is superior to Workstation Cryptography in that a Secure Computer at one site can forward the necessary keying material to another site, whether it be a Secure Internet Services System or some other node on the Public Network. This forwarding can be closely controlled and audited, and the superior revocation facilities used to place a limit on the period during which the forwarded material can be used.

The invention is superior to Network Cryptography in that it permits controls, auditing, protection, and authentication to the granularity of the individual Client rather than just to the node.

Although the present invention has been described with reference to the preferred embodiments, those skilled in the art will recognize that changes may be made in form and detail without departing from the spirit and scope of the invention.

What is claimed is:

1. A firewall device comprising:
    a processor;
    a memory; and
    a secure operating system having an operational kernel and an administrative kernel, wherein the operational kernel includes a Type Enforcement security mechanism for restricting execution of files stored in the memory by the processor, further wherein execution restrictions placed on files in the memory can only be modified from within the administrative kernel.

2. The firewall device of claim 1, further comprising:
    executable instructions stored in the memory and operable on the processor for causing the firewall device to filter network traffic received over a network interface.

3. The firewall device of claim 1, wherein the firewall device includes a virtual page translator having page access control bits and wherein the secure operating system uses the page access control bits to ensure that resource protection checks are not avoided.

4. The firewall device of claim 1, wherein the secure operating system prevents access to executable objects that have not been recognized as a trusted executable object.

5. A server comprising:
    a processor;
    a secure operating system having a security mechanism for restricting access by processes to server resources, wherein the security mechanism includes a means for establishing an assured pipeline between processes operating in different domains; and
    a firewall operating on the processor, wherein the firewall interacts with the secure operating system to limit interactions between processes in different.

6. The server of claim 5, wherein the security mechanism is a Type Enforcement security mechanism.

7. The server of claim 5, wherein the security mechanism is a multilevel secure computer mechanism.

8. The server of claim 5, wherein the security mechanism prevents execution of executable objects that have not been recognized as a trusted executable object.

9. The server of claim 5, wherein the processor includes a virtual page translator having page access control bits and wherein the secure operating system uses the page access control bits to ensure that file protection checks are not avoided.

10. The server of claim 5, further comprising:
    a memory;
    a first network interface;
    a second network interface; and
    software in the memory that is operable on the processor for causing the server to:
    encrypt outbound network traffic received on the first network interface;
        send the encrypted outbound network traffic over the second network interface;
    decrypt inbound network traffic received on the second network interface; and
    send the inbound decrypted network traffic on the first network interface.

11. The server of claim 10 wherein the firewall uses the assured pipeline to communicate data between the first and second network interfaces.

12. The server of claim 11, wherein the means for establishing the assured pipeline comprise:
    a means for performing a file permission check; and
    a means for performing a secure operating system permission check.

13. A method of securing server resources, the method comprising:
    restricting access by a process in an external domain to a server resource in the internal domain using a secure operating system, wherein the secure operating system includes a security mechanism for establishing an assured pipeline between one or more processes in the external domain and one or more processes in the internal domain;
    operating a firewall on the server's processor, wherein the firewall interacts with the secure operating system to limit interactions between processes in different domains according to a security policy.

14. The method of claim 13, wherein the security mechanism is a Type Enforcement security mechanism.

15. The method of claim 13, wherein the security mechanism is a multilevel secure computer mechanism.

16. The method of claim 13, wherein the security mechanism includes preventing execution of executable objects that have not been recognized as a trusted executable object.

17. The method of claim 13, wherein the secure operating system uses page access control bits to ensure that file protection checks are not avoided.

18. The method of claim 13, further comprising:
encrypting outbound network traffic received over a first network interface;
sending the encrypted outbound network traffic over a second network interface;
decrypting inbound network traffic received on the second network interface; and
sending the inbound decrypted network traffic on the first network interface.

19. The method of claim 18, wherein operating the firewall includes establishing the assured pipeline between the first and second network interfaces.

20. The method of claim 19, wherein establishing the assured pipeline includes:
performing a file permission check; and
performing a secure operating system permission check.

21. A secure system for transferring data between computers across a public network, the system comprising:
a workstation connected to an internal network;
a gateway computer connected to the internal network though a first network interface and connected to the public network though a second network interface, wherein the gateway computer includes a means for establishing an assured pipeline between the first and second network interfaces, receives data from the workstation on the first network interface, encrypts the received data, and transmits the encrypted data using the second network interface; and
a remote computer connected to the external network configured to receive the encrypted data from the gateway computer.

* * * * *

UNITED STATES PATENT AND TRADEMARK OFFICE
CERTIFICATE OF CORRECTION

PATENT NO. : 7,730,299 B2 Page 1 of 1
APPLICATION NO. : 11/669025
DATED : June 1, 2010
INVENTOR(S) : William E. Boebert et al.

It is certified that error appears in the above-identified patent and that said Letters Patent is hereby corrected as shown below:

On page 3, under "Other Publications", in column 1, line 27, delete "Secuirty" and insert -- Security --, therefor.

On page 3, under "Other Publications", in column 2, line 41, delete "Reqest" and insert -- Request --, therefor.

On Sheet 7 of 14, in Figure 6, line 1, delete "Subybe" and insert -- Subtype --, therefor.

In column 1, line 10, delete "09/221,662," and insert -- 09/221,665, --, therefor.

In column 3, line 3, delete "an" and insert -- and --, therefor.

In column 17, line 8, delete "an" and insert -- a --, therefor.

In column 17, line 59, delete "the" and insert -- The --, therefor.

In column 17, line 61, delete "if" and insert -- If --, therefor.

In column 23, line 45, delete "DRounted" and insert -- DRouted --, therefor.

In column 24, line 1, delete "addition" and insert -- additional --, therefor.

In column 26, line 28, delete "VOP_SEATTR" and insert -- VOP_SETATTR --, therefor.

In column 31, line 40, delete "be" and insert -- is --, therefor.

In column 34, line 12, in Claim 21, delete "though" and insert -- through --, therefor.

In column 34, line 13, in Claim 21, delete "though" and insert -- through --, therefor.

Signed and Sealed this

Tenth Day of August, 2010

David J. Kappos
*Director of the United States Patent and Trademark Office*